Figure 1:
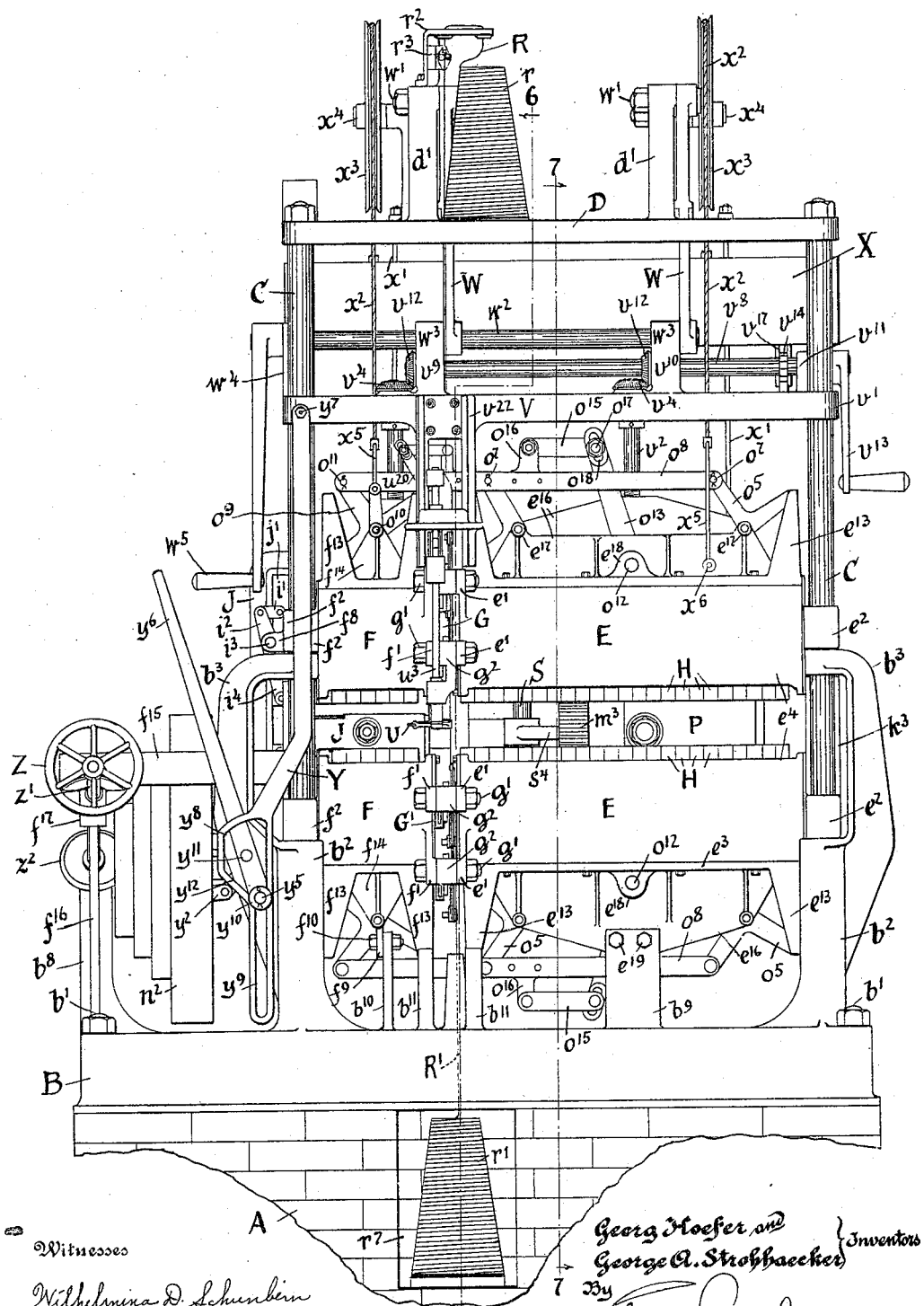

G. HOEFER & G. A. STROHHAECKER.
HAM AND SAUSAGE TYING MACHINE.
APPLICATION FILED JUNE 16, 1909.

966,746.

Patented Aug. 9, 1910.

15 SHEETS—SHEET 1.

Witnesses
Wilhelmina D. Schuenbein
M. W. Blackburn

Inventors
Georg Hoefer and
George A. Strohhaecker
By
George Wetmore Colles
Attorney G. HOEFER & G. A. STROHHAECKER.
HAM AND SAUSAGE TYING MACHINE.
APPLICATION FILED JUNE 16, 1909.

966,746.

Patented Aug. 9, 1910.
15 SHEETS—SHEET 7.

Fig. 7

G. HOEFER & G. A. STROHHAECKER.
HAM AND SAUSAGE TYING MACHINE.
APPLICATION FILED JUNE 16, 1909.

966,746.

Patented Aug. 9, 1910.
15 SHEETS—SHEET 8.

Witnesses
W. D. Schuenbein
M. W. Blackburn

Inventors
Georg Hoefer & George A. Strohhaecker,
By George Wetmore Colles
Attorney G. HOEFER & G. A. STROHHAECKER.
HAM AND SAUSAGE TYING MACHINE.
APPLICATION FILED JUNE 16, 1909.

966,746.

Patented Aug. 9, 1910.
15 SHEETS—SHEET 9.

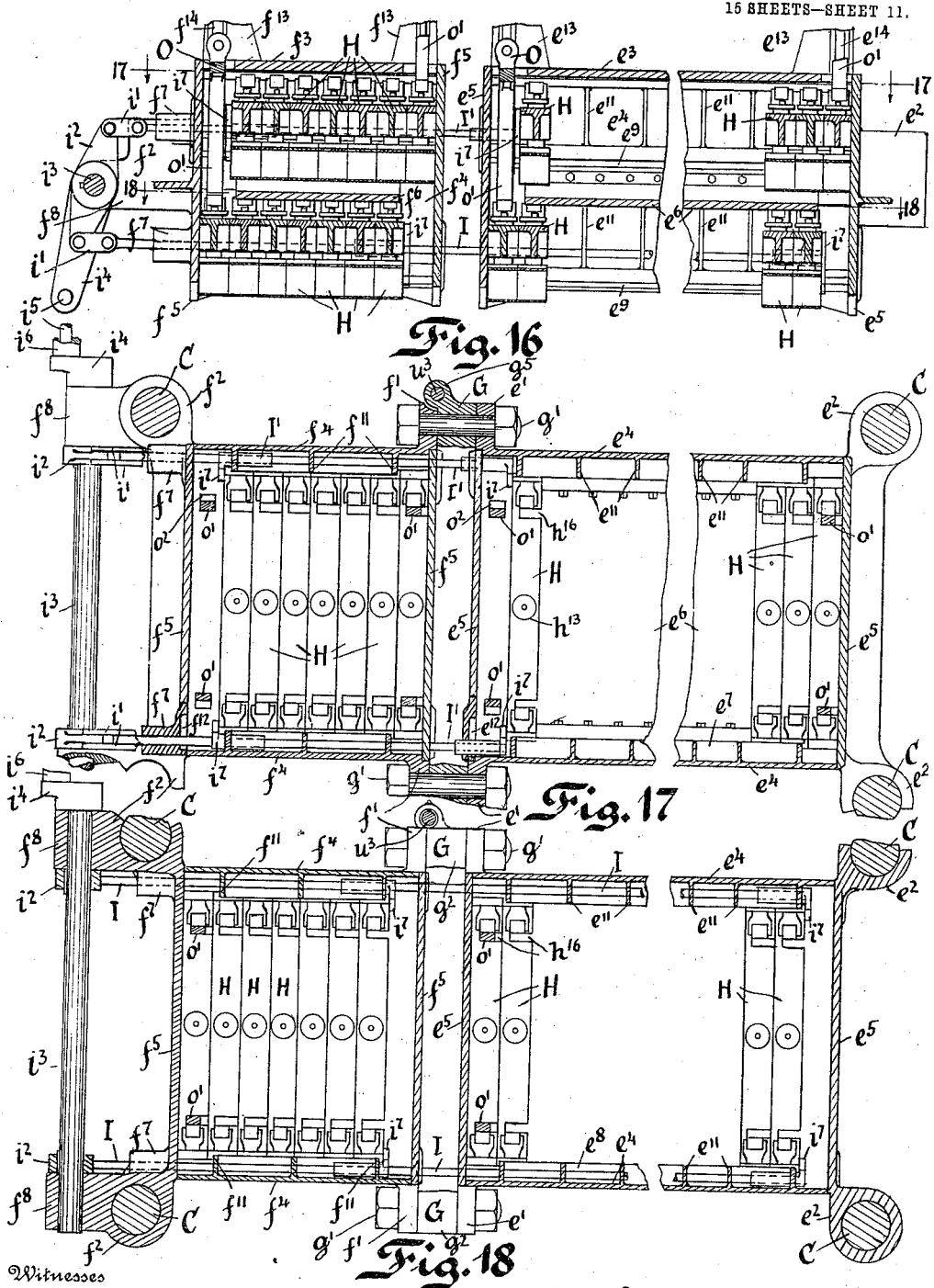

G. HOEFER & G. A. STROHHAECKER.
HAM AND SAUSAGE TYING MACHINE.
APPLICATION FILED JUNE 16, 1909.
966,746.
Patented Aug. 9, 1910.
15 SHEETS—SHEET 12.
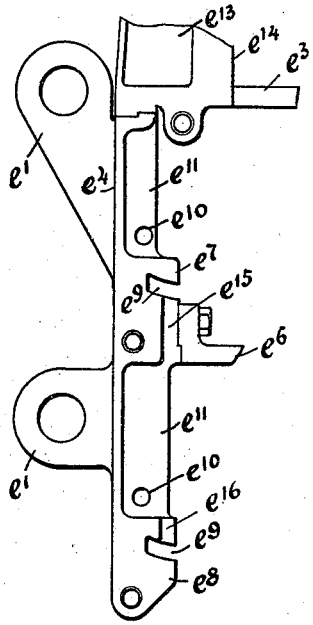
Fig. 19
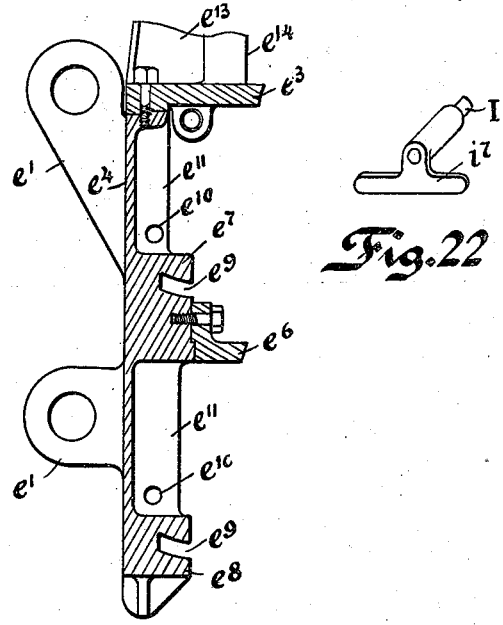
Fig. 20
Fig. 22
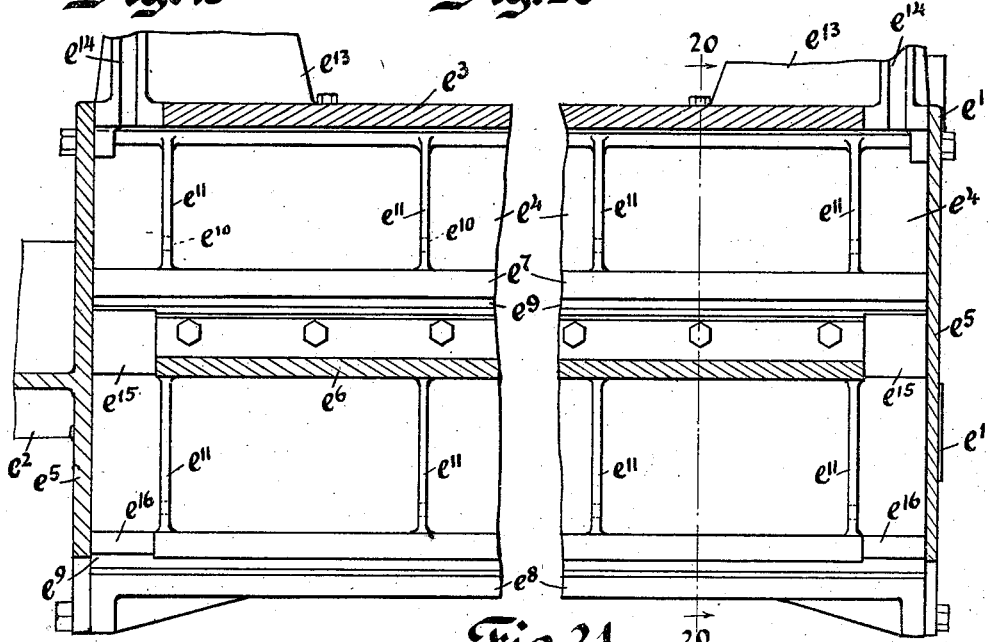
Fig. 21
Witnesses
W. D. Schienbein
M. K. Blackburn
Georg Hoefer, George A. Strohhaecker,
Inventors
By
George Witmer Cobb
Attorney

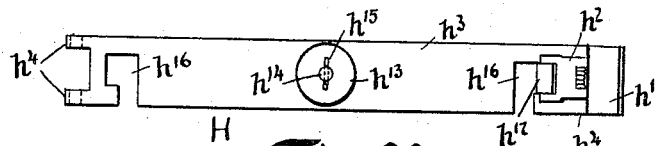

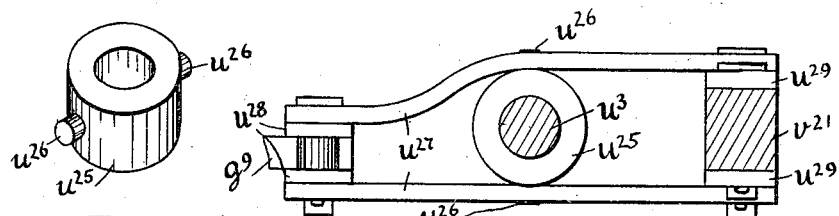

G. HOEFER & G. A. STROHHAECKER.
HAM AND SAUSAGE TYING MACHINE.
APPLICATION FILED JUNE 16, 1909.

966,746.

Patented Aug. 9, 1910.
15 SHEETS—SHEET 15.

UNITED STATES PATENT OFFICE.

GEORG HOEFER AND GEORGE ANTON STROHHAECKER, OF MILWAUKEE, WISCONSIN.

HAM AND SAUSAGE TYING MACHINE.

966,746.  Specification of Letters Patent.  Patented Aug. 9, 1910.

Application filed June 16, 1909. Serial No. 502,545.

*To all whom it may concern:*

Be it known that we, GEORG HOEFER and GEORGE ANTON STROHHAECKER, of Milwaukee, Wisconsin, have invented a Ham and Sausage Tying Machine, of which the following is a specification.

This invention relates to means for automatically tying up cased meats such as sausages and hams and in brief any kind of meat which is stuffed into a tubular casing. At the present time it is customary in the trade to wrap such preparations securely with stout cord to hold them in shape during the smoking process; before which they are very soft and will not hold their shape, but after smoking they are sufficiently dried out and rigidified to hold their shape properly after the cord has been removed. This tying up of the meats is done by hand, and as it occupies considerable time and requires skilled operators to perform it neatly and rapidly, it forms an important item in the cost of preparing such meats.

The object of the present invention is to perform the said operation of tying cased meats entirely by machinery and to dispense with hand-work; to enable the tying process to proceed with much greater rapidity and to be performed with greater accuracy and uniformity; and finally to enable it to be done with unskilled labor.

The invention comprises in its main elements, means for holding a cased meat (which shall herein for greater brevity be designated the sausage, meaning thereby any meat incased in a tubular casing); means for advancing it longitudinally through the machine; means for wrapping it with cords at regular intervals; and means for engaging these cords at regular intervals in the form of stitches. We further provide means for adjusting the machine by a simple and easy adjustment to any size of sausage within certain limits; and for opening or spreading the holders or carriers of the machine whereby a sausage may be removed or inserted in the machine at will.

Owing to the soft and yielding nature of the casing before the sausage is smoked, and the great danger of tearing it, it is necessary that it should be properly supported at all points within the machine, at least up to the point at which it is tied; and we therefore provide combined holding and advancing means (herein termed the carrier) which is adapted to clasp the sausage at all points and move bodily along with it.

In performing the stitching or tying operation we provide two cords which are carried in a semicircular arc halfway around the sausage on opposite sides thereof, and are mutually engaged in two rows of stitches on each side of the sausage.

Figure 2:
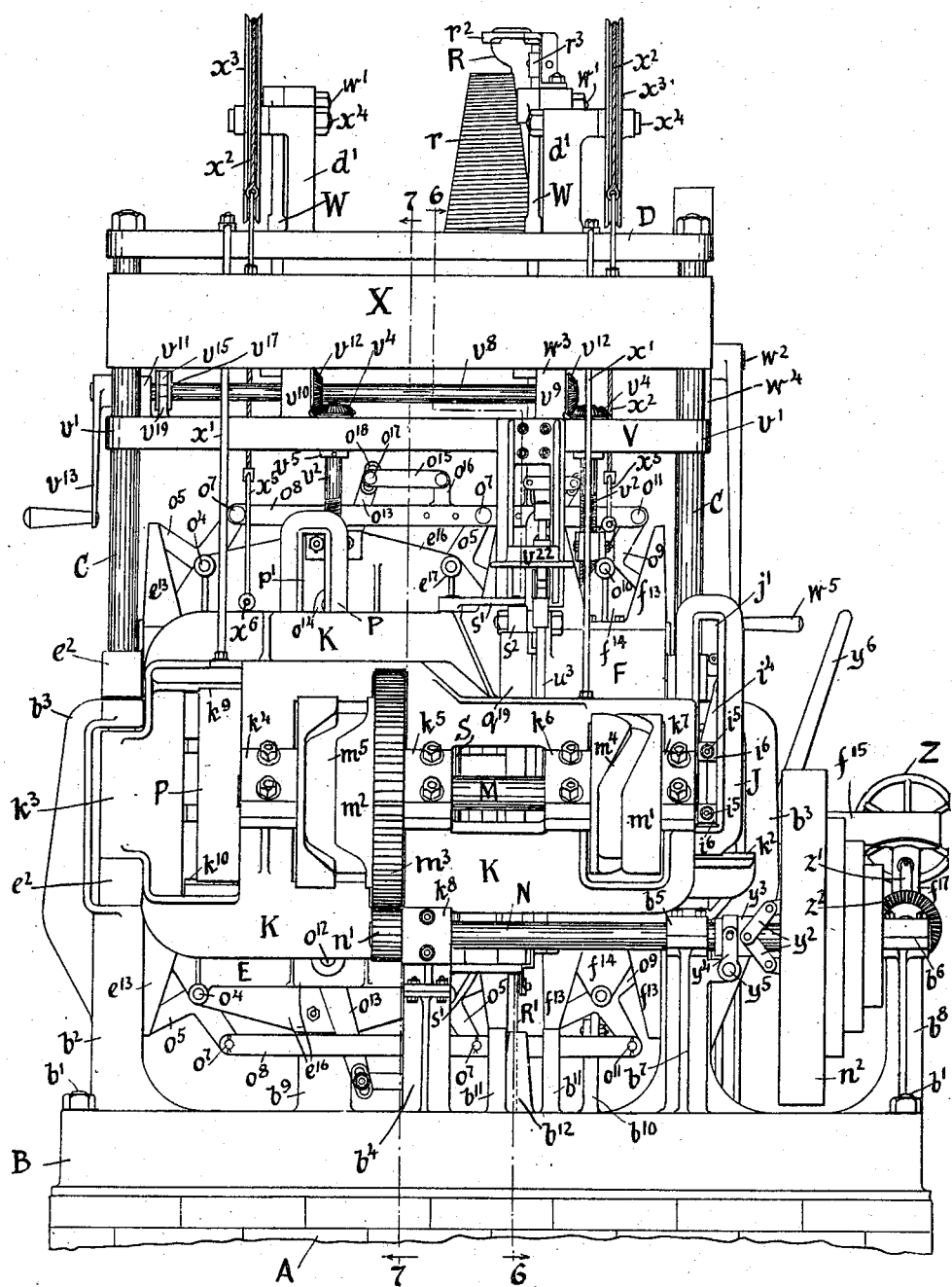
Figure 3:
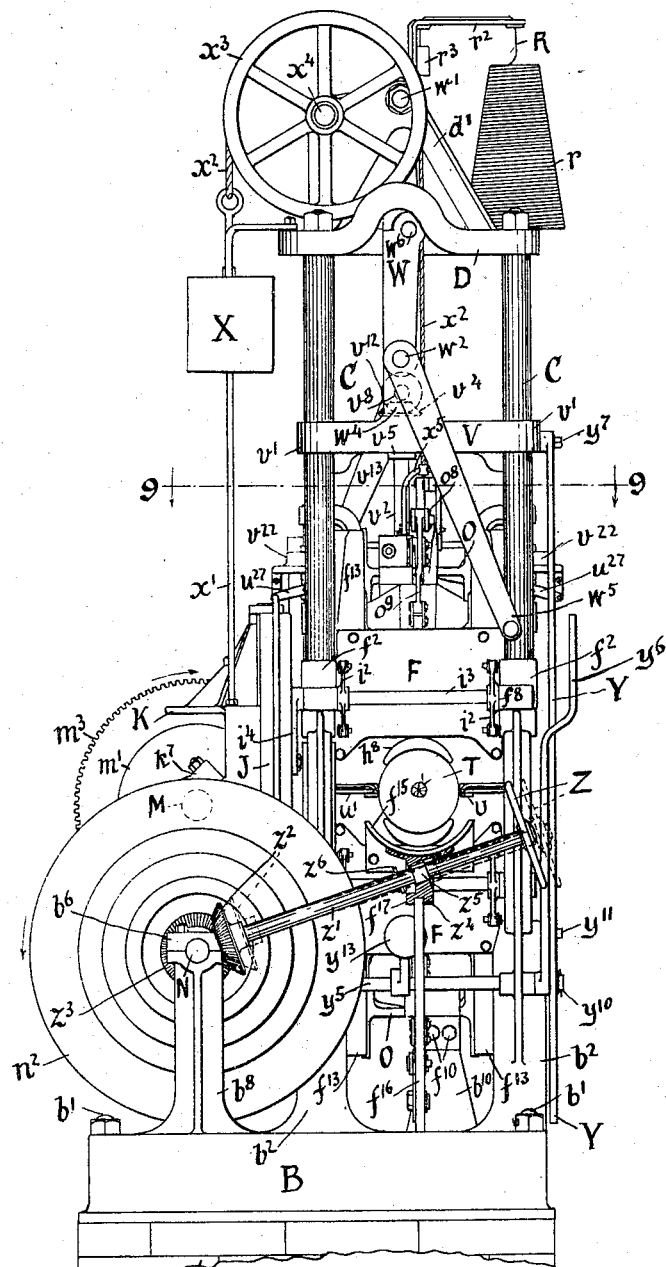
Figure 4:
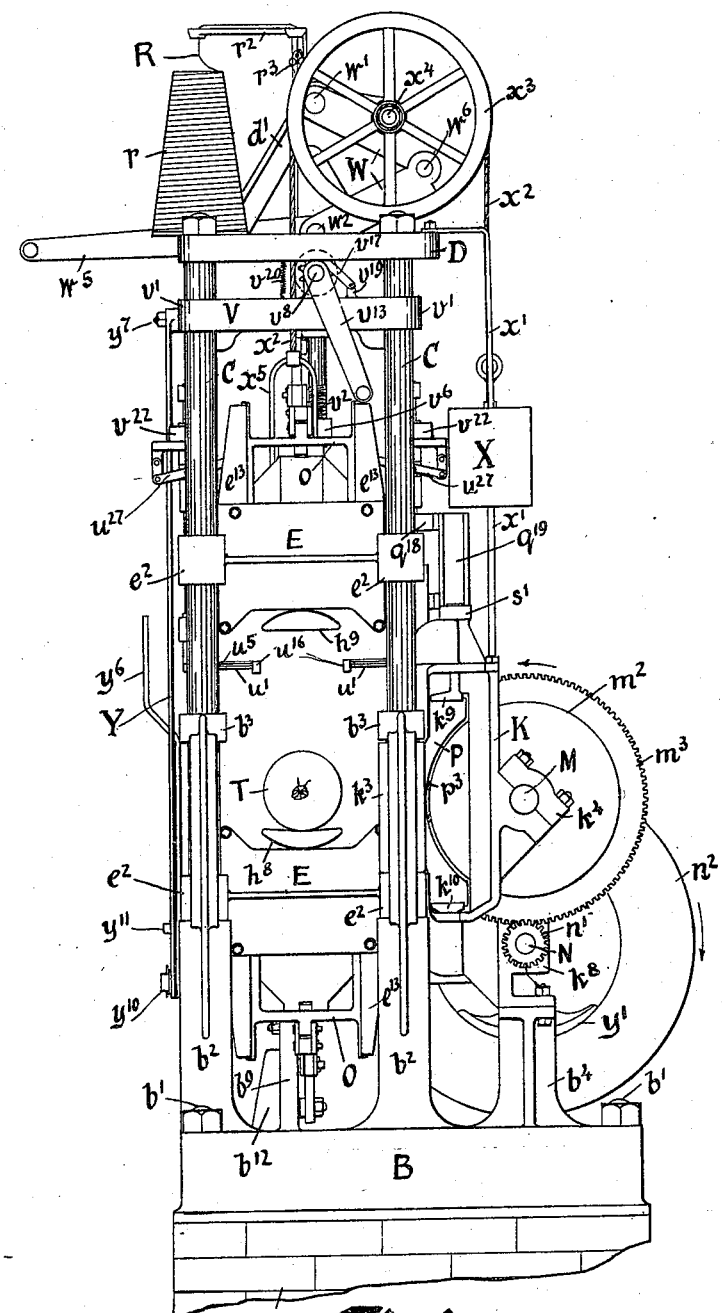
Figure 5:
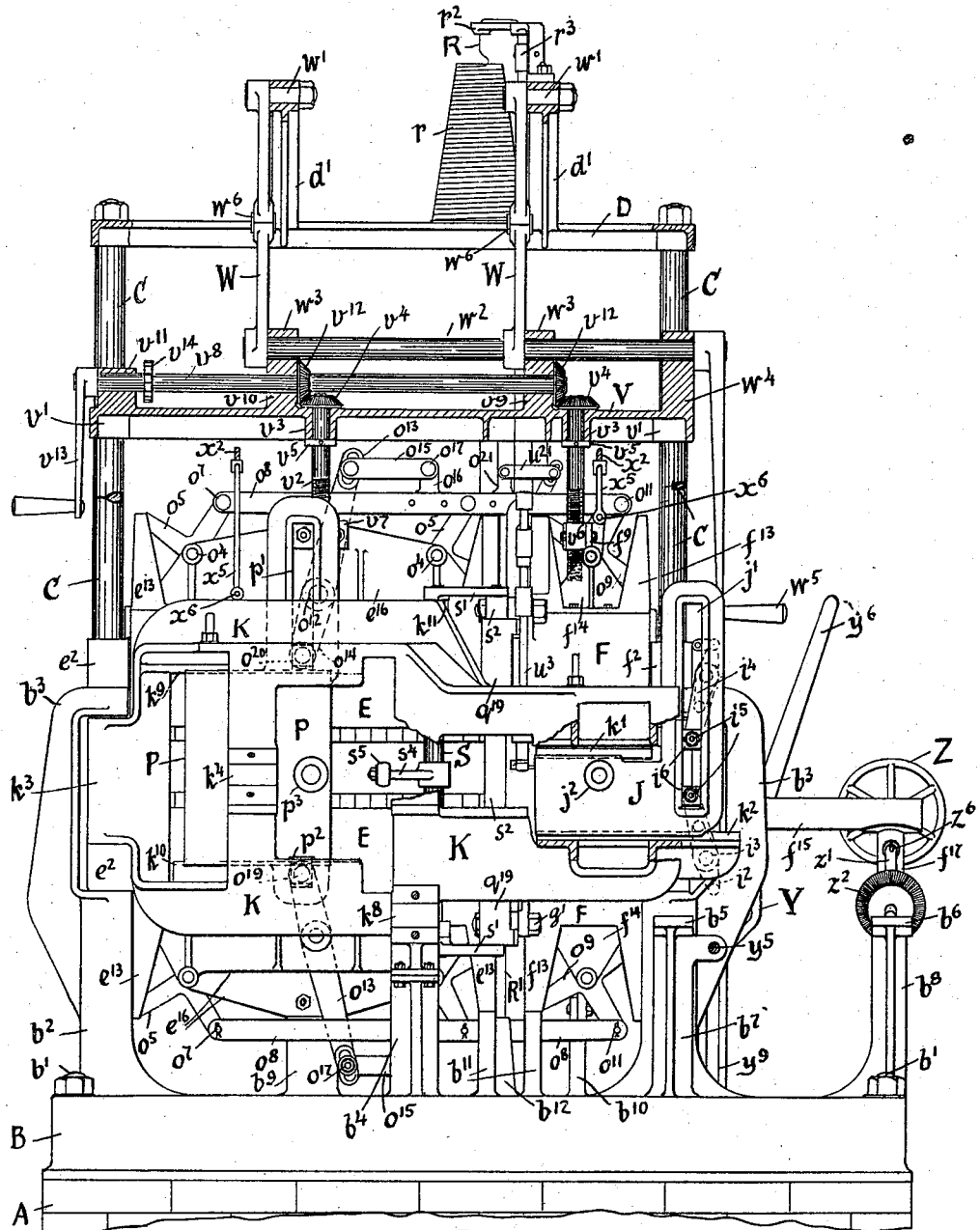
Figure 6:
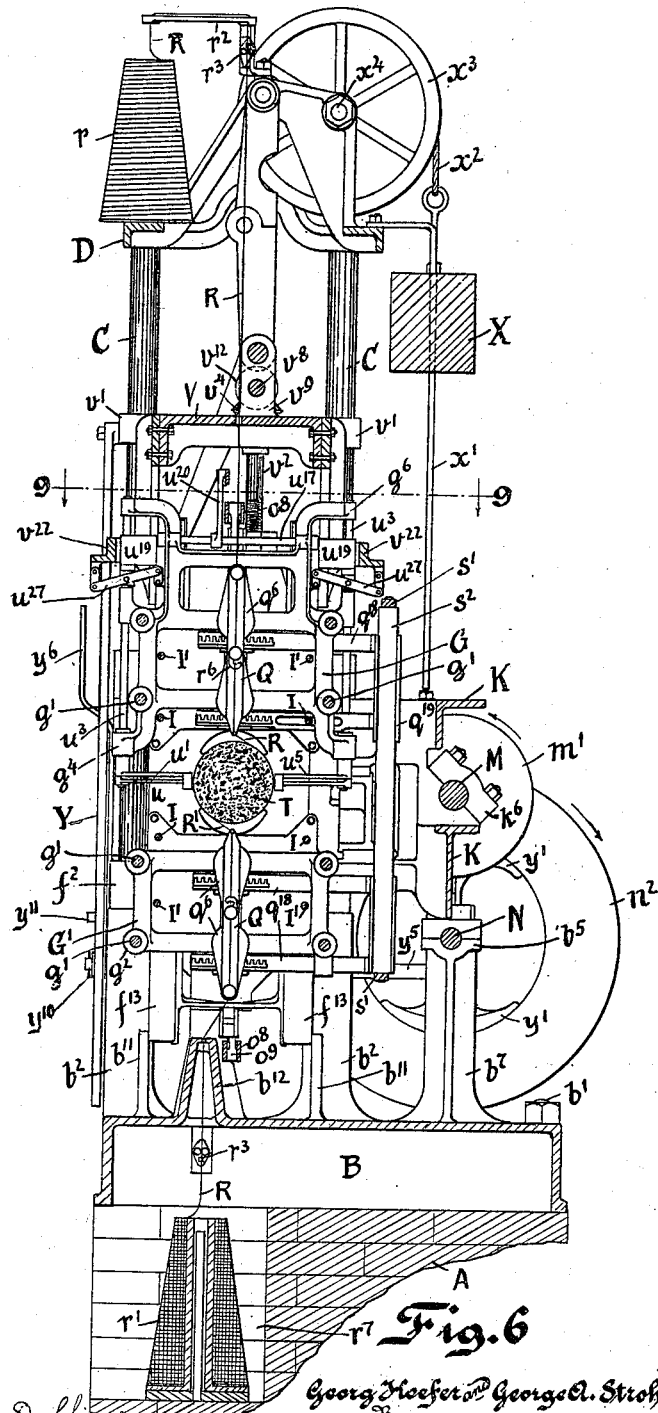
Figure 8:
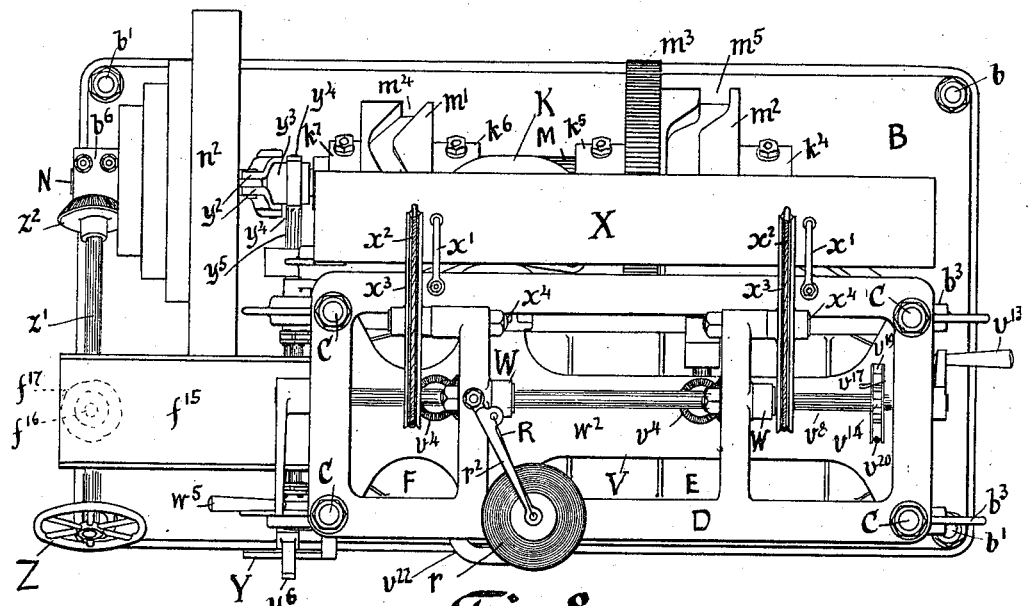
Figure 9:
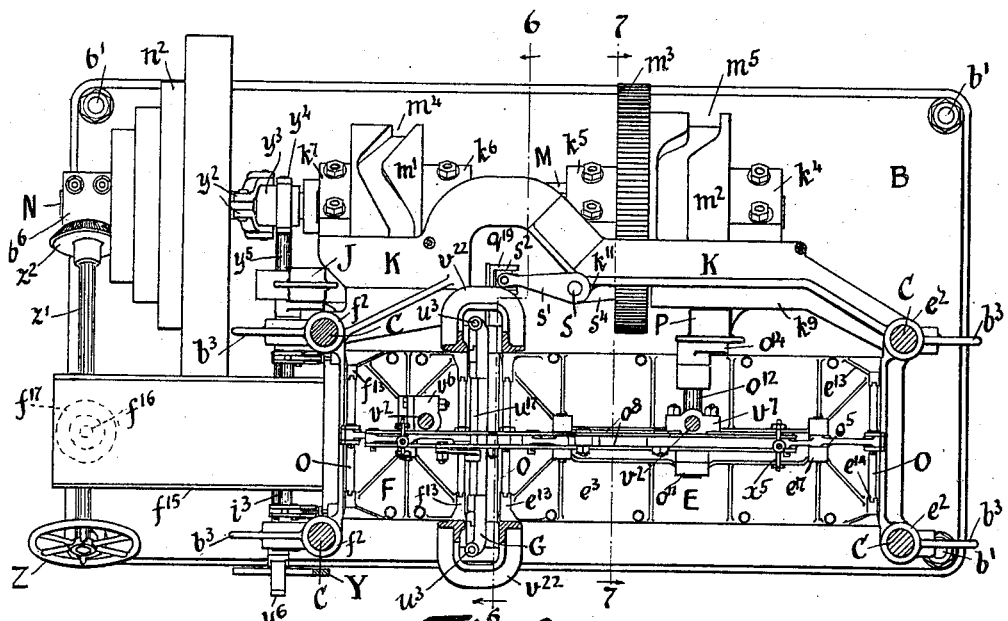
Figures 10, 11, 12:
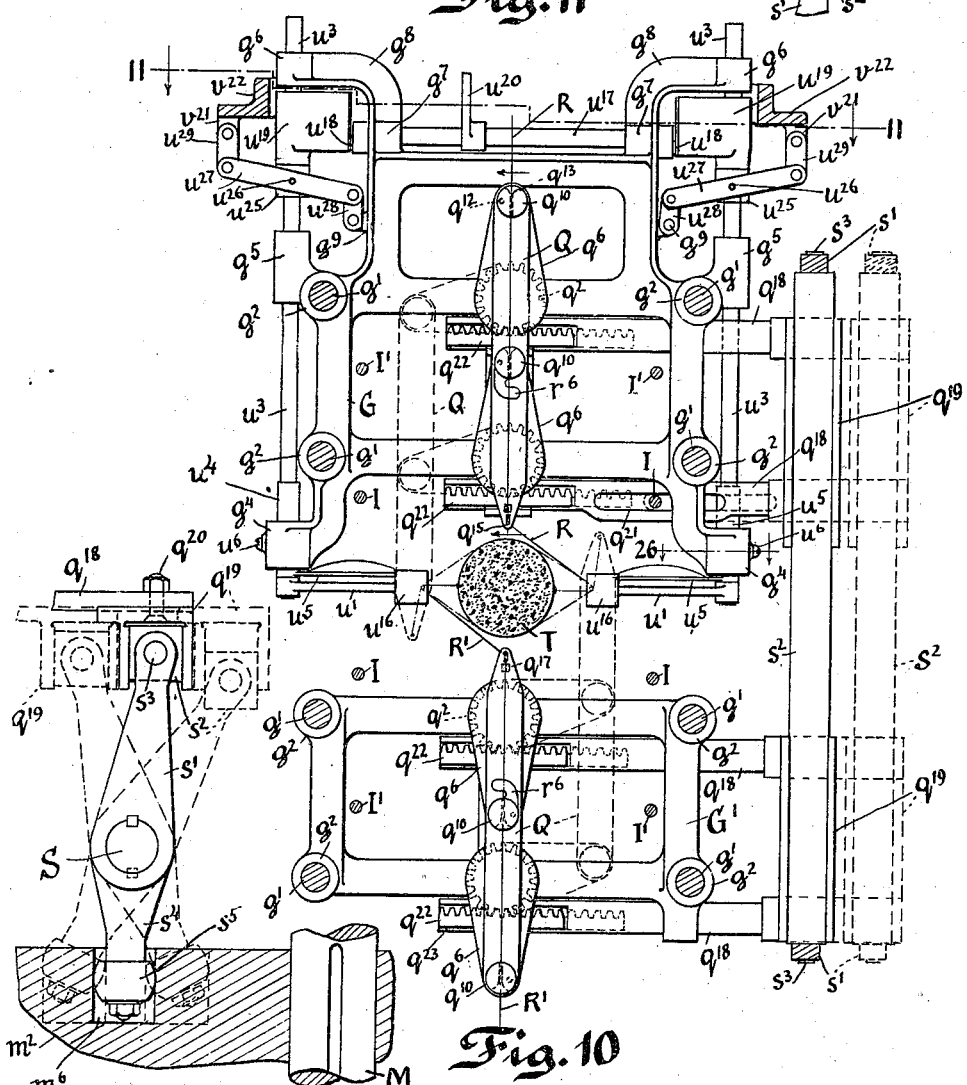
Figure 13:
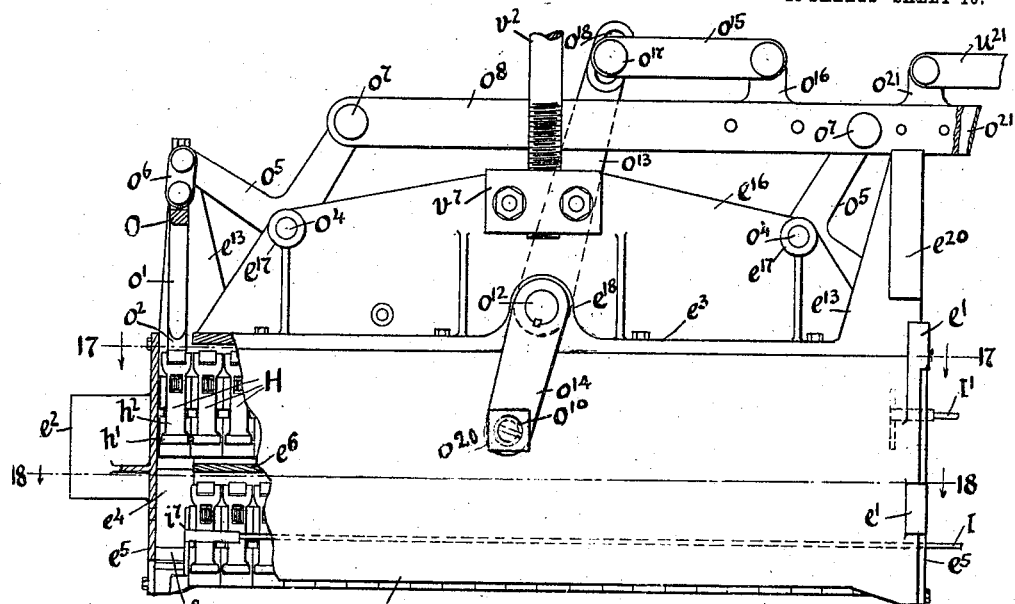
Figures 14, 15:
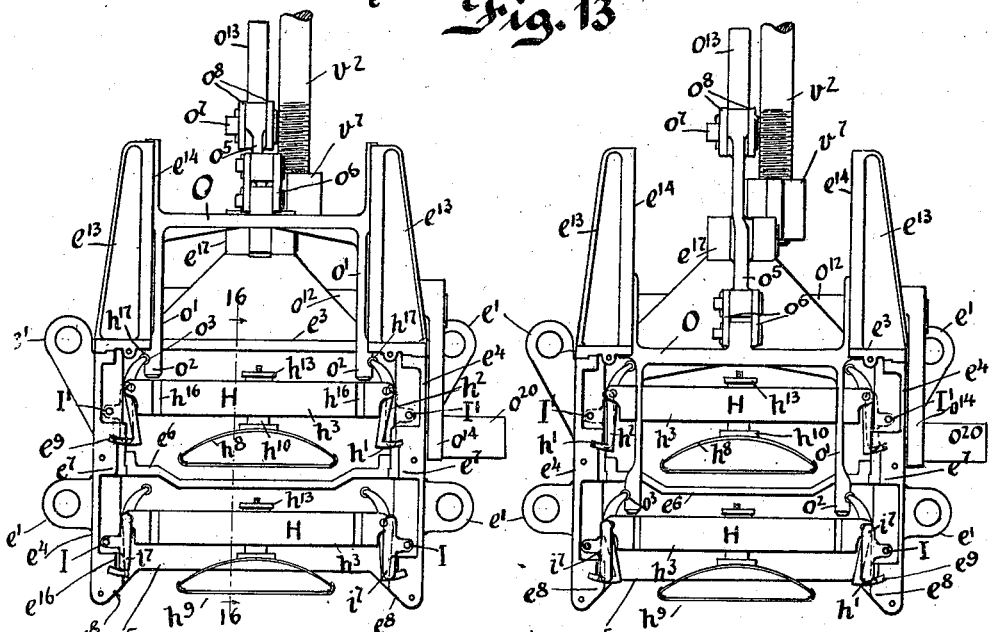
Figure 43:
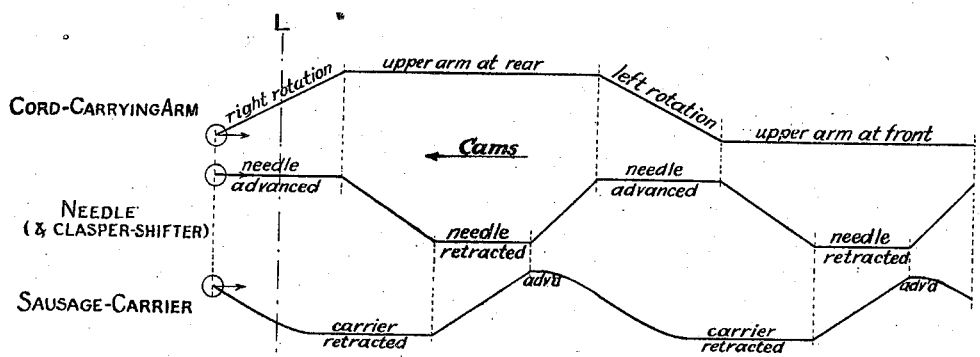
Figure 44:
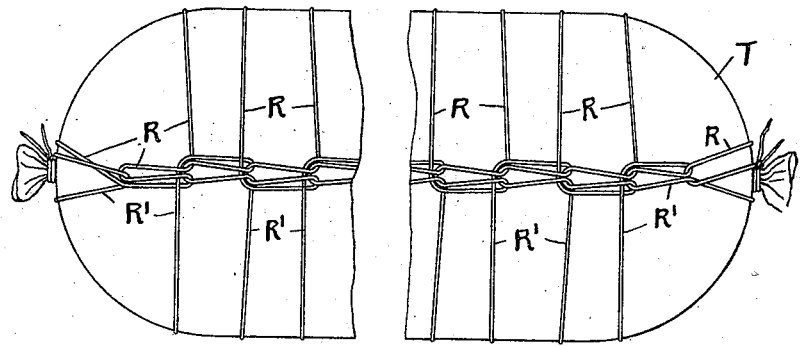
Figures 45, 46:
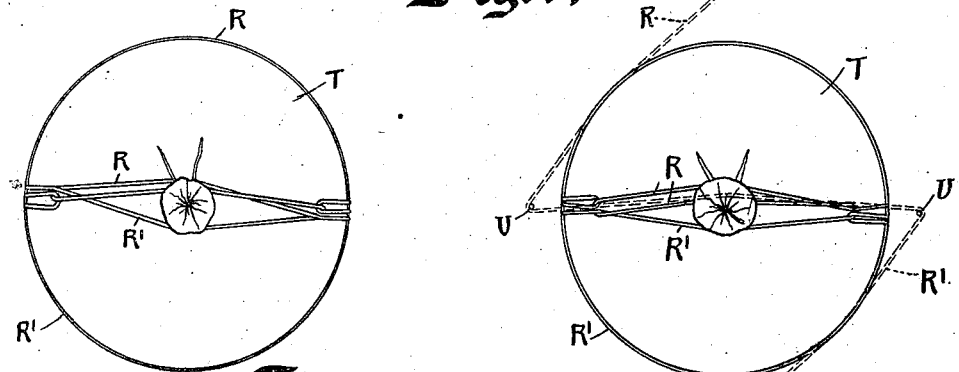

Our invention consists in the construction and combinations which will be hereinafter particularly described and set forth in our claims, which are illustrated in the accompanying drawings, wherein, Figure 1 is a front elevational view of the complete machine; Fig. 2 is a rear elevation of the same; Fig. 3 is a left-hand end elevation thereof; Fig. 4 is a right-hand end elevation thereof; Fig. 5 is, as to the upper portion, a longitudinal median section, and as to the lower portion, a rear elevation with the operating-shaft, cam-shaft and cams removed, and certain parts accessory thereto broken away; Fig. 6 is a vertical transverse section on the plane 6, looking toward the left-hand end of the machine; Fig. 7 is a vertical transverse section on the plane 7, looking toward the right-hand end of the machine; Fig. 8 is a plan view of the complete machine; Fig. 9 is a plan section thereof on the plane 9; Fig. 10 is a face-elevation on a larger scale of the wrapping- and tying-mechanism; Fig. 11 is a plan section of the same taken on the stepped plane 11; Fig. 12 is a fragmentary plan-view on a still larger scale of the mechanism for operating the rack-bars which shift the cord-carrying arm; Fig. 13 is a rear elevation, partly broken away, of one of the carriers, being that one which is on the infeed side; Fig. 14 is an end elevation of the same from the left-hand end of Fig. 13, showing the clasper-shifter in raised position; Fig. 15 is a similar view showing the clasper-shifter in lowered position; Fig. 16 is a vertical longitudinal median section through both of the upper carriers, omitting the tying-mechanism, a part of the claspers being removed and the middle portion of the infeed-carrier being broken out to bring the figure within the limits of the drawing; Fig. 17 is a plan section of the same on the plane 17 of Fig. 13; Fig. 18 is a plan section of the same on the plane 18 of Fig. 13; Fig. 19 is an end view of one of the casing-walls of the carrier; Fig. 20 is a longitudinal section therethrough on the plane 20 of Fig. 21; Fig. 21 is a face-view of the inner face of the same casing-wall, a part of the middle being broken out to bring it within the limits of the drawing; Fig. 22 is a perspective view of one of the carrier-dogs; Fig. 23 is a plan view of one of the claspers; Fig. 24 is a side elevation thereof, partly in median section; Fig. 25 is an end-view of the same; Fig. 26 is a plan view of the needle, needle-guide and other accessory parts, showing also the cord in the position of making a stitch; the bearing, sleeve and shaft being shown in section on the plane 26 of Fig. 10; Fig. 27 is a vertical longitudinal section through the parts shown in Fig. 26, on the plane 27 thereof; Fig. 28 is an end face-view on an enlarged scale of the perforated lug of the needle-guide showing the needle in the act of drawing a loop thereinto; Fig. 29 is a longitudinal section through the same on the plane 29; Fig. 30 shows the star-wheel and resilient holder for releasably holding the carrier-adjusting mechanism; Fig. 31 is a side view, partly in median section, of the upper cord-carrying arm and the parts associated therewith; Fig. 32 is an end view of one of the pivot-pins for the cord-carrying arm, looking from the right-hand end of Fig. 31; Fig. 33 is a transverse section through the cord-carrying arm and crank-arm, on the plane 33 of Fig. 31; Fig. 34 is a perspective view of one of the sleeves which supports the needle-shaft; Fig. 35 is a plan view of the supporting-sleeve and levers for the needle-shaft and the parts associated therewith, showing the needle-shaft in section; Fig. 36 is a side elevation of the same, showing the bifurcated block in longitudinal section; Fig. 37 is a face-view of one of the tension-devices for the cord-carrying arms; Fig. 38 is an edge-view looking from the top of the device as shown in Fig. 37; Fig. 39 is a longitudinal section through the same on the plane 39; Fig. 40 is a front elevation of one of the tension-devices which are mounted on the frame; Fig. 41 is a face-view of and Fig. 42 a longitudinal median section through the adjustable connection between the rock-arm and link for operating the needles; Fig. 43 is an operating diagram of the comparative concomitant movements of the machine which form a cycle, the line L designating the position in which the parts are shown in the assembled views, Figs. 1 to 10; Fig. 44 is a side-view of the sausage after being wrapped and tied, a portion being broken out of the middle to bring it within the limits of the sheet; Fig. 45 is an elevation of the right-hand or finishing end of the same; and Fig. 46 is an elevation of the right-hand or beginning end thereof.

In these drawings the same parts are designated by the same reference letters or numerals in each figure.

In the invention of this machine it was necessary first to find and adopt a satisfactory form of stitch, and secondly to provide means for forming that stitch. The stitch which has been adopted for use is a two-cord stitch, each cord being carried half around the sausage, and the stitches being formed at opposite sides of the sausage by the interlocking of the two cords at the ends of the semi-convolutions, as will be seen in Fig. 44; but, without at the present time attempting to describe the stitch very minutely, we will proceed to a consideration of the mechanism for accomplishing it and for handling the sausage. The mechanism may be considered under the heads of (1) the sausage-holding and advancing mechanism, or sausage-carrier, (2) the cord-carrying mechanism, (3) the stitch-forming mechanism, (4) the adjusting and opening movements, (5) the automatic cut-out and (6) the hand-operating mechanism.

Referring to the assembled views, upon a suitably constructed foundation A, of sufficient height to bring the apparatus to a convenient position for the operator, is mounted the bed-plate B of the machine, and secured thereto by foundation-bolts $b'$. On this bed-plate are formed four upstanding lugs $b^2$, on which are mounted the four vertical frame-bolts C, secured at their upper ends to the top-frame-casting D, these several parts thus forming together the supporting framework of the machine. On these bolts C are mounted the sausage-carriers E, F, four in number, in two symmetrically disposed pairs one on each side of the tying-mechanism; the longer carrier, E, being the infeed, and the shorter, F, the delivery-carrier. Each lower carrier E or F is identical in construction with the upper one, but reversed in position. Each carrier E is secured to the adjacent carrier F by means of bolts $g'$ connecting the lugs $e'$, $f'$ on the frames of said carriers, the frame G of the tying mechanism being interposed between the two carriers and having lugs $g^2$ through which the bolts $g'$ pass. Thus each pair of carriers E, F form with the tying-mechanism a rigid unit, and each has on its outer ends a pair of lugs $e^2$, $f^2$, embracing the bolts C, the lower pair of carriers E, F, resting upon the upper ends of the base-lugs $b^2$ and the upper-carriers being suspended adjustably at a variable height above the lower carriers to provide for different sizes of sausages, in a manner which will be hereinafter described. The upper carriers are, however, provided with lugs $e^2$, $f^2$ embracing the frame-bolts C the same as the lower carriers, and extensions $b^3$ of the base-lugs $b^2$ are provided which rigidify the frame-bolts C and may serve as abutments for the lower limit of movement of the upper carriers.

We will now proceed to describe the construction of the carriers in detail.

*The sausage-carrier.*—One of the infeed-carriers E is illustrated detached from the machine in Figs. 13, 14 and 15, and an infeed and delivery carrier are shown together in Figs. 16, 17 and 18. The infeed-carrier consists of a box made up of a top or bottom-plate (as the case may be) $e^3$, a pair of side-plates $e^4$, a pair of end-plates $e^5$, and a transverse central plate $e^6$ which rigidly unites the side-plates $e^4$. The inner sides of the side-plates $e^4$ are formed with projecting ribs $e^7$, $e^8$ (Figs. 19, 20, and 21), in each of which is a groove $e^9$, which is formed to receive and retain the horizontally projecting toe $h'$ of a spring-lever $h^2$, which is carried by one of a set of organisms H, whose function is to clasp, hold and advance the sausage, and which we shall here term claspers. One of the claspers is shown separately in Figs. 23, 24 and 25 (Sheet 13). Each clasper comprises a horizontal bar $h^3$ having on each end ears $h^4$ for the pivot-pins $h^5$ of the spring-lever, $h^2$, which latter is provided with a central opening or slot $h^6$ around the pivot to receive a coiled torsion-spring $h^7$ mounted on the pin $h^5$, the action of the spring being in such direction as to keep the toe $h'$ at the lower end of the lever normally thrust out as shown in the lower clasper of Fig. 14 and the upper clasper of Fig. 15. Thus the clasper is held normally in sliding engagement with the two grooves $e^9$ on opposite sides of the casing.

The bar $h^3$ carries mounted at the center thereof a spring-bow $h^8$, which is formed of a resilient plate of metal the ends of which are united by a strap $h^9$ of leather, canvas or other material which, when the sausage is pressed against it, is adapted to enfold and clasp the same without damage to the casing thereof, in the manner illustrated in Figs. 3, 6 and 7 and in dotted lines in Fig. 24. The bow $h^8$ is secured upon a stem $h^{10}$, which is slidably mounted within a bore $h^{11}$ in the center of the bar $h^3$, and is held resiliently pressed forward by a coiled spring $h^{12}$, one end of which abuts upon an adjustable abutment-plug $h^{13}$ threaded into the upper end of the bore, said plug having itself a central bore through which the upper or reduced end $h^{14}$ of the stem $h^{10}$ passes. The prolongation $h^{14}$ projects through the bore in the plug and has a cross-pin $h^{15}$ which limits the downward movement of the spring-bow with respect to the abutment-plug. Thus it will be seen that while the bow is resiliently mounted so as to yield upwardly under pressure of the sausage, each clasper can be individually adjusted until the pressure upon the sausage is the same for all. These claspers are arranged in two rows, one upon the upper, the other on the lower track formed by the grooves $e^9$ in the lugs $e^7$, $e^8$, the claspers being preferably adjacent so as to form, when clasping the sausage, a continuous tube, without leaving any interval between the claspers (although this is not essential to the invention), and the claspers in the active row are moved bodily along, carrying the sausage with them and advancing it a distance equal to the width of one clasper for each cycle of the machine, while the claspers in the opposite row are simultaneously advanced an equal distance in the opposite direction. At each cycle the clasper on the end of each row which comes against the end of the box is automatically shifted to the opposite row, where an empty space is left for it by the advancing movement of the clasper which occupied that position at the previous cycle.

The delivery-carrier is made up of the top-plate $f^3$, side-plates $f^4$, end-plates $f^5$ and transverse central plate $f^6$ (Figs. 16 to 18), similar to the corresponding parts of the infeed-carrier, and supporting similar upper and lower rows of claspers H, and requires therefore no separate description.

The manner of producing the endwise or advancing movement of the rows of claspers is as follows: Within the carrier-box, in the recesses of the side-plate $e^4$, $f^4$, opposite the ends of the bars $h^3$ of both rows, are mounted two pairs of reciprocating rods I, I', which we shall here term carrier-rods, and which extend through both the infeed- and delivery-carriers, being mounted in journal-apertures $e^{10}$ formed in the internal ribs $e^{11}$, $f^{11}$, of the side-plates $e^5$, $f^5$. These rods pass through bearing-lugs $f^7$ on the end-plate $f^5$ of the delivery-carrier-casing on the left-hand end of the machine, and are connected by links $i'$ to a pair of double rock-arms $i^2$, which are mounted upon a rock-shaft $i^3$ pivoted in bearings $f^8$ on the lugs $f^2$ (see Figs. 1, 16, 17 and 18). The rock-shaft $i^3$ extends rearwardly to a point beyond the rear lug $f^2$, and has mounted on its end a crank $i^4$, which has a crank-pin $i^5$ on which is pivoted a sliding-block $i^6$ engaging in a slot $j'$ of a second sliding-block J, (Figs. 2 and 5), which is mounted upon slide-bearings $k'$, $k^2$ of the rear frame-casting K, which has perforated lugs $k^3$ at its ends embracing the bolts C, and is otherwise supported centrally by a pedestal $b^4$.

At the rear of the machine, and extending longitudinally thereof, is the horizontal cam-shaft M, which is mounted in bearings $k^4$, $k^5$, $k^6$, $k^7$ (see Fig. 2), and which carries two cam-blocks $m'$, $m^2$, the latter being provided with the spur-gear-teeth $m^3$ engaging in a pinion $n'$ on the main shaft N, which turns in a bearing $k^8$ on the casting K and in two bearings $b^5$, $b^6$ which are supported on pedestals $b^7$, $b^8$ springing from the bed-plate B. The main shaft is driven by means of a stepped fly-wheel-pulley $n^2$, connected with the shaft as will be hereinafter described.

Returning to the sliding-block J, in the slot $j'$ of which the ends of the cranks $i^5$ belonging to the upper and lower carriers are both guided, this sliding-block receives its reciprocating movement from the cam $m'$, by means of a cam-roller $j^2$ (Fig. 5), which engages in the cam-groove $m^4$ in the cylindrical surface of said cam. The form of this cam-groove is such that each carrier-rod I, I' is once advanced and retracted in each cycle of the machine, and the movement of the upper and lower carrier-rods of each carrier are of course simultaneous and opposite, due to their connection to the opposite ends of the rock-arms $i^2$, and the fact that the upper row of claspers H in the carrier must move in opposite direction from the lower one. Each carrier-rod I, I' has mounted upon it a pair of dogs $i^7$, one in each carrier E, F, the rods I for the inner or active row of claspers having the dogs $i^7$ at the right-hand end of each carrier, and the outer rods I' having them at the left-hand end of each carrier (see Figs. 16, 17 and 18). These dogs lie in the path of movement of the end-claspers of each row. At the beginning of the advance-stroke of the carrier-rods, as the claspers are being moved by the shifting-devices hereinafter described from the foot of one row to the head of the next, the dogs $i^7$ lie out of the way in recesses $e^{12}$, $f^{12}$, in the end-plates $e^5$, $f^5$; and as the claspers reach their new positions, the dogs $i^7$ are advanced by the rods I, I', engaging the ends of the claspers and carrying with them the whole row a distance equal to the width of a clasper, as aforesaid.

The mechanism for shifting the claspers vertically from one row to the opposite as they reach the end of the row is as follows: On the top-plate $e^3$ of each of the infeed carriers, and at each end of said top-plate, are mounted a pair of standards $e^{13}$, which have slideways $e^{14}$ for vertically reciprocating plungers O. Each plunger O has on each side a depending extension or bar $o'$, which is of special form, having a knob $o^2$ on its lower end. An opening $h^{16}$ is formed near each end of the bar $h^3$ of the clasper to allow the knob $o^2$ to pass through it, and this opening is slotted out on one side, as shown in Fig. 23, to permit the end-clasper of the outer row to be shifted sidewise while the plunger is depressed (as in Fig. 15), to occupy the position previously occupied by the clasper just shifted by the plunger to the inner row. The knob $o^2$ on the lower end of the bar $o'$ of the plunger has on its outer face a notch $o^3$, which is adapted to receive a small roller $h^{17}$ carried by the upper end of the spring-lever $h^2$, and the depth of this notch is such that when the roller $h^{17}$ is engaged therein, the toe $h'$ of the spring-lever is released from the groove $e^9$ and the clasper therefore is supported entirely by the plunger and ready to partake of its shifting movement to shift the clasper to the opposite row. The machine feeds the sausage from right to left, hence the shifting movement on the right-hand end of each carrier will always be in an inward direction (downward for the upper carrier), and upon the left-hand end of each carrier in an outward direction.

It will be observed from Figs. 14 and 15, and more clearly in Figs. 19, 20 and 21, that the upper lug $e^7$ is notched out at its ends below the grooves $e^9$, at $e^{15}$, and that the lower lug $e^8$ is correspondingly notched at $e^{16}$, above the groove $e^9$. This is to enable the toe $h'$ of the spring-lever $h^2$ to clear the edge of the notched-out portion in passing from one groove to the other, without clearing the outer edge of the groove. It will be seen that, just before the roller $h^{17}$ drops into the notch $o^3$, the toe $h'$ will be drawn farther in than when the roller is in said notch, and the outer sides of the grooves $e^9$ must therefore extend sufficiently far beyond the edge of the notched-out portions to prevent the toe $h'$ from clearing them at that moment, otherwise the clasper would be carried or fall out of place.

On the top-plate $e^3$ of the infeed-carrier, formed as a part thereof, are a pair of longitudinal webs $e^{16}$, which form rigidifying and supporting means for the carrier and also means for carrying the operating-mechanism of the clasper-shifters. On these webs $e^{16}$ are formed bearings $e^{17}$ for the pivot-pins $o^4$ of a pair of right-angled levers $o^5$, the horizontal arms of which are connected by links $o^6$ to the plungers O, while the upright arms are connected by pins $o^7$ to a pair of parallel bars $o^8$. The delivery-carrier F, which is shorter than the infeed-carrier, because it is not necessary to support for its full length the wrapped portion of the sausage, has standards $f^{13}$ similar to the standards $e^{13}$, and operating in the same manner, but, in place of the two bell-crank levers $o^5$, carries a single three-arm or T-lever $o^9$, which is pivoted at $o^{10}$ upon webs $f^{14}$, and whose horizontal arms are connected with the respective plungers O, and whose upright arm is pivoted by a pin $o^{11}$ between the two extended ends of the parallel bars $o^8$; so that the clasper-shifters of both carriers act in unison.

The means for reciprocating the parallel bars $o^8$ comprises a rock-shaft $o^{12}$ pivotally mounted in ears $e^{18}$ on the top-plate $e^3$ and carrying at one end a rock-arm $o^{13}$ and at the other a crank $o^{14}$. The rock-arm $o^{13}$ is connected by a link $o^{15}$ to the bars $o^8$, or preferably said link is pivoted on the upper end of a T-shaped piece $o^{16}$, which is riveted between the bars $o^8$, and the end of the link which is connected to the rock-arm $o^{13}$ has an adjustable pivot-pin $o^{17}$ which is slidable within a slot $o^{18}$ in the end of the rock-arm; whereby the movement or travel of the clasper-shifters may be exactly adjusted after the carrier is assembled. This device is similar to that shown in detail in Figs. 41 and 42.

The shaft $o^{12}$ is oscillated by the crank $o^{14}$, which carries on its end a crank-pin $o^{19}$ on which is mounted a rectangular slide-block $o^{20}$, said slide-block engaging within a vertical slot $p'$ in a second slide-block P, which reciprocates horizontally upon slide-bearings $k^9$, $k^{10}$ on the rear frame-casting K (see Fig. 5). It will be observed that the slide-block P has, beside the vertical slot $p'$ for the upper carrier, a second vertical slot $p^2$ for the lower carrier, which is arranged in exactly the same way and in symmetrical position; but the upper slot $p'$, as well as the slot $j'$ in the slide-block J, is elongated upwardly for the purpose of permitting the upper carriers to be raised and adjusted in the manner which is hereinafter described. The slide-block P is reciprocated by means of a cam-roller $p^3$, which engages in a cam-groove $m^5$ formed in the cylindrical surface of the cam-block $m^2$, which is mounted on the cam-shaft M.

The relative movements of the carrier-rods and shifters is described later on.

*The cord-carrying mechanism.*—This is illustrated more particularly in Figs. 10, 11, and 12 of the drawings, and its details in Figs. 31 to 33. The frame G, which is mounted between the upper infeed and delivery-carriers, has its counterpart in the frame G' which is mounted between the lower infeed and delivery-carriers, and is identical with it in shape except for the omission of certain parts of the upper frame G which carry the elements of the stitch-forming mechanism; therefore the same reference letters apply to both so far as the elements of the upper frame are present in the lower. The said frame is of generally rectangular form, having the bolt lugs $g^2$ at its four corners, and in the middle of its two horizontal bars are mounted two stub-shafts $q'$, in vertical alinement, on which turn a pair of gear-pinions $q^2$, which are secured on said shafts by means of nuts $q^3$ and washers $q^4$ set within central recesses $q^5$ in the open face of said pinions; and upon the open face of each pinion is secured a crank-arm $q^6$ by means of screws $q^7$, said crank-arm having a flange $q^8$ which engages the margin of the central recess $q^5$, whereby it is maintained in central position. On the free ends of said crank-arms is mounted the cord-carrying arm Q, by means of pivot-pins $q^9$, which have broad, flat heads $q^{10}$ on the face of the arm Q and are secured in place of linch-pins $q^{11}$. These pins $q^9$ are held against rotating with respect to said arm Q by any suitable means, such as small pins $q^{12}$ set in suitable registering recesses in the abutting faces of the heads $q^{10}$ and arm Q, as shown in Fig. 33. The head of each pin is recessed and perforated by a vertical bore $q^{13}$, through which passes the cord R, and which acts as a guide therefor, the upper end of each bore being flared laterally as shown in Fig. 32, so as to give an easy passage to the cord when it enters obliquely, as happens when the arm is at either side of the central position. The lower end of the arm Q carries a projecting nose $p^{14}$, which is perforated by a bore $q^{15}$ through which the cord R is passed, and a flanged antifriction-wheel $q^{16}$ is provided at the point where the direction of the cord changes in passing through the bore $q^{15}$ to prevent undue resistance to movement, or abrasion of the cord. In addition a guiding eye $q^{17}$ is preferably placed on the face of the arm Q just above the wheel $q^{16}$, so as to prevent the cord from running off the wheel.

The two cords which are used to tie the sausage are, for the sake of distinction, designated R and R', and they are brought from cops or spools $r$ $r'$, which are mounted at the top and bottom of the machine. The upper cop $r$ is mounted on the frame-plate D, and to draw the cord therefrom we have provided a bracket-arm $r^2$ supported on one of the bridges $d'$. The cord passes downwardly through the center of the plate D and through a hole in the plate V (Fig. 6), thence through the apertures $q^{13}$ in the pins $q^9$, through the eye $q^{17}$, thence around the wheel $q^{16}$ and through the nose $q^{14}$, as heretofore described.

For giving a suitable tension to the cord, two tension devices are provided. The first, designated $r^3$, is of any suitable type, and as herein shown consists of a pair of rollers $r^4$ between which the cord is caused to pass and a guiding eye $r^5$ (Fig. 40). This device is only for the purpose of providing sufficient tension on the cord to prevent it from becoming loose between the frame and the cord-carrying arm; and a second device $r^6$, which produces the real tension, and consists of a spring-finger (shown in separate view in Figs. 37, 38 and 39), is mounted under the head of one of the pins $q^9$ and resiliently presses the thread against the face of the arm Q. These devices may be varied without affecting the essentials of our invention.

For the lower cord-cop $r'$ a recess $r^7$ is formed below the bed-plate R in the foundation of the machine, and may be open in front to permit of the ready insertion and removal of the cop, the thread therefrom passing directly upward through the tension device $r^3$ and through an apertured guide-lug $b^{12}$ to the lower cord-carrying arm, which is provided with a tension device $r^6$ the same as the upper arm.

It should be understood that in the construction of this device it is exceedingly necessary to maintain the space between the supporting claspers on opposite sides of the tying-mechanism as small as possible, as otherwise the sausage will droop between the two carriers and will not be in proper position for tying, and furthermore the casing is liable to be cut or torn by the edges of the claspers. In the present instance, for example, we have succeeded by the foregoing design in reducing the clear space between the carriers E and F to 1⅜ inches, which would make a maximum distance of 2⅜ inches between the claspers on each side where these are given a width of one inch.

The cord-carrying arms are operated by means of a set of rack-bars $q^{18}$ which slide laterally and are mounted in bearing-recesses $g^3$ formed on the frame G. Said bars $q^{18}$ extend to the rear of the machine and are united by a channel-shaped crosshead $q^{19}$, which is secured to each rock-arm by a bolt $q^{20}$, as shown in Fig. 12. One of the rack-bars $q^{18}$ (the lower one of the upper cord-carrying arm) is formed with a slot $q^{21}$ to clear the carrier-rod I which passes through it.

It will be observed that the rack-bar $q^{18}$ sliding in the recess $g^3$ lies behind the pinion $q^2$ and is therefore held in place by the latter, and mounted on the face thereof is the rack $q^{22}$, which rests upon a small shoulder $q^{23}$ on the rack-bar and engages the teeth of the pinion, and is secured in place by one or more screws $q^{24}$ passing through countersunk holes from the inner face of the rack-bar, as shown in Fig. 31.

The reciprocation of the rack-bars is accomplished by means of a rock-shaft S, which is journaled in bearings $k^{11}$ on the casting K and has two rock-arms $s'$ mounted on its ends which support a pivoted rectangular bar $s^2$ having gudgeons $s^3$ turning in bearings in the ends of said rock-arms. The bar $s^2$ operates within the channels of the crossheads $q^{19}$, and it will be observed that the construction is such as to permit of a vertical sliding movement of the upper crosshead $q^{19}$ upon the bar $s^2$ which takes place when the upper carriers are raised to open the machine or adjusted in the manner hereinafter described. At a proper point upon the shaft S, in horizontal alinement with the cam-shaft M, is mounted the cam-arm $s^4$, which carries on its end a spherical cam-roller $s^5$, and this latter is engaged within a cam-groove $m^6$ which is formed in the plane face of the cam-block $m^2$ and is shown in face elevation in Fig. 7. The form of this cam-groove is such as to reciprocate the rack-bars $q^{18}$ first to the right and then to the left in a cyclical movement, and so carry each cord-carrying arm Q around a semicircular path in the same rotative direction; so that the said arms Q are always situated in diametrically opposite positions. The ends of the travel of each arm Q are on opposite sides of the sausage T. Their central positions are shown in full lines in Fig. 10, and their terminal positions at one end of their respective travels in dotted lines in the same figure. The arc of movement given to the crank-arms $q^6$ is actually somewhat greater than a semicircle, being sufficient to carry the nose $q^{14}$ of the cord-carrying arm Q past the needle and to carry the cord over said needle to enable it to be engaged by the latter. As, however, in the present design of our machine, this arc remains constant while the size of sausage varies, the distance which the ends of the arms may be carried past the needle will of course vary with the size of said sausage, being greater for a smaller size of sausage (as in Fig. 10) and less for one of larger size.

*The stitch-forming mechanism.*—This mechanism consists of two arcuate hooked needles U and the devices incidental thereto, mounted entirely upon the upper frame G, which therefore is provided with accessory lugs and extensions not present on the lower frame G'. Each needle U is carried in a holder-arm $u'$, in which it is adjustably secured by means of a set-screw $u^2$; and said arm $u'$ is mounted upon the lower end of the needle-shaft $u^3$, which is vertically supported in bearing lugs $g^4$, $g^5$, $g^6$ formed as extensions upon the frame G; it being understood that there are a pair of needles, arms, shafts, etc., symmetrically disposed with respect to the arm Q on the front and rear sides of the frame G. The lug $g^4$ does not act directly as a journal for the shaft $u^3$, but there is interposed between the lug and shaft the sleeve $u^4$ of the needle-guide $u^5$, and said sleeve $u^4$ is arranged to slide vertically within the lug $g^4$ without turning therein. This may be accomplished by a screw $u^6$ set in the side of the lug $g^4$, and having a reduced end $u^7$ which engages in a longitudinal groove $u^8$ in the sleeve $u^4$. Thus the needle-guide accompanies the needle in its vertical movements but does not oscillate therewith.

The needle-guide is provided at its free end with a perforated lug $u^9$ through which the needle passes, and it will be observed that the recess $u^{10}$ for the cord in the hooked extremity of the needle is of just sufficient size to receive the cord therein, and the aperture $u^{11}$ in the lug $u^9$ through which the needle passes is grooved out laterally as shown at $u^{12}$ in Figs. 28 and 29, so that the loop of cord which is drawn back by the needle in its retracting movement is carried into said aperture $u^{11}$, while the loop already upon the needle passes over the recess $u^{10}$ without catching therein, and thus falls off the needle-point upon the succeeding loop.

The needle-guide $u^5$ is also provided with an extension $u^{13}$ which lies in front of the needle on the opposite side of the cord-carrying arm Q, having flat-guiding faces $u^{14}$, $u^{15}$ for the latter, which is guided between them as it reaches the end of its travel, as shown in Fig. 26. The flanged edge $u^{16}$ of the lug $u^{13}$ acts as a shield for the projecting parts of the needle and needle-guide, so as to prevent the delicate casing of the sausage from being possibly caught and torn by said projecting parts.

The means for oscillating the needle-shaft $u^3$ to advance and retract the needle comprises a transverse shaft $u^{17}$ mounted in bearings $g^7$ formed in the extensions $g^8$ of the frame that support the bearing-lugs $g^6$. Said shaft carries on each end an eccentric pin $u^{18}$ which engages between the arms of a bifurcated block $u^{19}$ mounted on the needle-shaft, there being one such block upon each needle-shaft. At an intermediate point on the shaft $u^{17}$ there is mounted a rock-arm $u^{20}$, which, inasmuch as (according to our present design) the needle can reciprocate concomitantly with the clasper-shifters, is connected directly with the parallel bars $o^8$. This connection takes place preferably by means of a link $u^{21}$, which is pivotally mounted at one end upon the T-shaped piece $o^{21}$ riveted between the bars $o^8$, and at the other end to a pivot-pin $u^{22}$, which, is adjustable within a slot $u^{23}$ in the end of the rock-arm $u^{20}$, and can be clamped in position by a nut $u^{24}$. Thus it is possible to adjust the amplitude of vibration of the needle independently of that of the claspers, while the actual position of the needle can be adjusted by means of the set-screw $u^2$.

*Adjusting and opening movements of machine.*—It is desired for ease of manipulation to provide for an easy separation of the carriers, so that access may be had to the sausage or sausages which are being run through the machine as well as to the tying-mechanism, and for obvious reasons it is also desirable to provide for adjusting the distance between the carriers so as to accommodate the machine to sausages of different sizes. In the present design the lower carriers and tying-mechanism in connection therewith are fixed in position, being supported at their ends upon the pedestals $b^2$ as previously described, in addition to which further supports may be provided in the form of upstanding lugs $b^9$, $b^{10}$ and $b^{11}$, springing from the bed-plate B; the lug $b^9$ being secured to the webs $e^{16}$ by means of bolts $e^{19}$, the lug $b^{10}$ to a similar projecting part $f^9$ from the top-plate of the carrier F by means of a bolt $f^{10}$, and the four lugs $b^{11}$ being placed directly below the standards $e^{13}$ and $f^{18}$ and forming rests therefor. The upper carriers E F with the upper tying-mechanism are, on the contrary, as heretofore indicated, slidably mounted upon the frame bolts C, and they have two kinds of movements, to wit, one for adjusting the carriers to be given size of sausage, and the other to raise it sufficiently high to leave free access to the space between the carriers.

The mounting by which these two movements is accomplished is as follows:—Upon the frame-bolts C above the carriers is slidably mounted a supporting-plate V, which has lugs $v'$ sliding upon the frame-bolts C. From this plate are suspended the carriers by means of a pair of screw-stems $v^2$, which are journaled in bearings $v^3$ (best shown in Fig. 5) in the supporting plate V, and carry beveled gears $v^4$ at their upper ends and collars $v^5$ mounted immediately below said bearings to prevent endwise movement of the stems therein. These stems engage in threaded sockets $v^6$, $v^7$ mounted on the projecting webs $e^{16}$, $f^9$ on the top-plates of the carriers. A horizontal shaft $v^8$ is mounted in bearing-lubs $v^9$, $v^{10}$ and $v^{11}$ on the plate V, and carries beveled gears $v^{12}$ which mesh with the beveled gears $v^4$; and at one end of the shaft, preferably the right-hand end, which projects beyond the end of the plate V, is mounted a hand-crank $v^{13}$. Thus by rotating the crank $v^{13}$ the carriers and tying-mechanism are adjustably moved up or down with respect to the plate V.

To hold the carriers to the position at which they are adjusted and prevent any rotation of the shaft $v^8$ which might be produced by the vibration of the machine, we have mounted upon the shaft $v^8$ a star-wheel $v^{14}$ (shown in detail in Fig. 30) with which engages a roller $v^{15}$ mounted upon a pin $v^{16}$ carried between two arms $v^{17}$, which are pivotally mounted on a pin $v^{18}$ mounted in a lug $v^{19}$ on the plate V; and said roller $v^{15}$ is held resiliently pressed into a bight of the star-wheel by a spring $v^{20}$ connected to the ends of the arm $v^{17}$ and to a fixed point upon the plate V. It will be understood that the angle of the star-wheel is such that the engagement above described will not prevent the ready manipulation of the crank $v^{13}$, but it offers sufficient resistance to hold the crank in the position in which it is set.

For the purpose of readily opening the machine, the plate V is made slidable as aforesaid, and is connected to the upper frame-plate D by a pair of toggles W, which are pivotally mounted at their upper ends upon pins $w'$ mounted in bridges $d'$ carried across the center of the plate D; and the lower ends of said toggles are fixed upon a shaft $w^2$, which turns in bearings $w^3$ formed by extensions of the bearing-lugs $v^9$, $v^{10}$, and in a third bearing-lug $w^4$ mounted on the opposite end of the plate V from the lug $v^{11}$. On the projecting end of this shaft $w^2$ is mounted a hand-crank $w^5$. It will be seen from Figs. 3 and 4, that when the crank $w^5$ is swung forward to the horizontal position it results in the raising up of the plate V and the carriers a sufficient distance to give free access to the interior.

In order to obviate unnecessary exertion on the part of the operator in raising the carriers by either of the two cranks $v^{12}$, $w^5$, they are overbalanced by means of a counterweight X, which has a vertical movement upon guide-rods $x'$ secured to the back-casting K and the upper plate D. Said counterweight is connected to the carrier by means of chains, cords or cables $x^2$, which pass over sheaves $x^3$ mounted upon stub-shafts $x^4$ on the bridges $d'$, the other ends of said cables being connected to bails $x^5$, which are pivoted upon pins $x^6$ carried by the webs $e^{16}$, $f^9$ of the respective carriers. The weight X is sufficiently great to cause it to normally sink and carry up with it all the parts supported by it, so that as soon as the crank is pulled forward just sufficient to carry the knuckle pin $w^6$, of the toggle-joint past the center, the whole apparatus, comprising the supporting-plate V, upper carriers, and tying-mechanism, rises of itself. When it is desired to depress it again, this is done by pulling down the crank $w^5$; and after it is in the lowered position it will be held therein, because the pin $w^6$ is on the opposite side of the line of thrust, and the weight of the crank $w^5$ (which is, as will be seen, in a somewhat angular position) will tend to maintain the toggle-joint in this position.

It will be seen from the foregoing description of the mechanism which drives the respective operative parts that no disconnection of the driven parts from their respective cams results from the vertical adjustment of them; the pins of the cranks $i^5$ and $o^{19}$ sliding in the slots $j'$, $p'$ of the respective slide-blocks J, P, the cross-head $q^{19}$ sliding upon the vertical bar $s^2$, and the needle-shaft $u^3$ sliding vertically in its bearings $q^4$, $q^5$ and $q^6$. It is, however, necessary that the needles and their guides should, in order to keep them in the median plane of the sausage, be moved vertically through one-half the vertical movement of the carriers. To accomplish this, each needle-shaft is supported by a sleeve $u^{25}$ (Figs. 10, 34, 35 and 36), placed immediately under the block $u^{19}$ and having a pair of gudgeons $u^{26}$ projecting from opposite sides and acting as pivots for a pair of levers $u^{27}$, which are thus pivoted at their centers. The inner ends of said levers are connected by links $u^{28}$ to lug $g^9$ upon the frame G, and their outer ends are connected by links $u^{29}$ to lugs $v^{21}$ on a pair of depending yokes $v^{22}$ which are bolted to the sides of the plate V. The centers of the levers $u^{27}$ lie in the axial plane of the needle-shaft, so that the needle-shaft has half the vertical movement of the frame G and the parts carried thereby. The yokes $v^{22}$ may, if desired, besides acting as supporting means for the levers $u^{27}$, act as auxiliary guides and lateral supports for the carriers, the adjacent standards $e^{13}$, $f^{13}$ being then provided with bearing-surfaces, as shown at $e^{20}$, Fig. 13.

The delivery-carrier being only of sufficient length to assist in carrying the sausage out of the machine, there is mounted on the outer end of the lower carrier F a supporting-table $f^{15}$ which extends a sufficient distance to support the outgoing sausages as they are pushed forward in succession until they can be removed by an attendant; or they may be permitted to drop from the end of said table into a basket placed there for the purpose. The outer end of this table $f^{15}$ is supported from the base B by a post $f^{16}$, on whose upper end is mounted a member $f^{17}$ to which the table is secured, and which has a further function referred to hereinafter.

The three operating cams $m^4$, $m^5$, $m^6$ are so related to each other in shape and position as to produce the relative movements of the parts which are exhibited diagrammatically in Fig. 43. Starting from the position indicated by the dotted line at the left of this figure, in which the upper cord-carrying arm is at the front, the lower cord-carrying arm at the rear, the needles in advanced position, the clasper-shifters in retracted position ready for another shifting movement, and the carrier-rods on their way back to the retracted position ready to advance the claspers and sausage, the cord-carrying arms are first rotated one stroke to the right, as seen in Fig. 10, which brings the arms into engagement with the needle-guides and carries the cords over the ends of the needles and into engagement with the grooves $u^{10}$ thereof. The needles next retract and carry with them each a bight of the cord into the recess $u^{11}$, as shown in Fig. 28, and thereupon the loop upon the shank of the needle from the previous stitch drops off and passes over the bight of cord which the needle has carried back with it, so that a new loop is formed. While the needles are retracting, the clasper-shifters are being advanced so as to move forward a set of claspers into active position, and as soon as this is completed the carrier-rods I advance, moving forward with them the entire inner rows of claspers and the sausage held thereby, while at the same time the outer rows of claspers are moved back the length of one stitch, that is to say, the width of one clasper. As soon as the advance movement of the sausage is completed, the needles move forward again into a position adjacent to the ends of the cord-carrying arms, so as to engage the cords a second time as the arms start on their travel in the opposite direction, this being the condition of things shown in Fig. 26. The arms then being rotated to the left are brought into their original positions, and, after another like movement of the needles, clasper-shifters and carrier-rods, the cycle of movement is completed, all as clearly illustrated in Fig. 43. The result is to form the series of stitches which are shown in Fig. 44, the right-hand end of said figure being the starting end. The line L in Fig. 43 represents the position of the several parts as shown in the assembled views, Figs. 1 to 10 inclusive.

In starting the machine, the ends of the cord, having been first threaded through the apertures, tension devices, guide-eyes, etc., of the machine, are tied together to each other and engaged with one end of the sausage, for example by tying them to the end of the casing. They are next passed around the needles, as indicated by the dotted lines in Fig. 46, and the machine is ready to be set in motion. If only one sausage is being wrapped, the cords may be cut at the end of the sausage and tied together, which holds them in place; but if a number of sausages are to be wrapped continuously the operation may be continued indefinitely, as the cords will engage together in the form of a braided cable if they have nothing to wrap. Thus a number of sausages not themselves connected may be strung together by the action of the machine.

*Automatic cutout.*—For convenience of operation the driving pulley $n^2$, which is mounted on the main shaft N, is not fixed to it but disconnectably connected therewith by means of a clutch of any suitable type which may be placed within the pulley, and its operative parts are, for the most part, not shown in the drawings, it being unessential in itself what style of clutch is used; but it may be represented by clutch-shoes $y'$ and toggle-joints $y^2$ mounted upon a sleeve $y^3$ on the shaft N, which sleeve may be shifted longitudinally by rock-arms $y^4$ mounted upon a horizontal shaft $y^5$, which extends to the front of the machine and has mounted upon its front end a shifting lever $y^6$; this operating so that when thrown to the right, that is to say into vertical position, the machine is disconnected from the driving-pulley $n^2$; and when thrown to the left, as shown in the drawings, it is connected. Now in order to prevent any disarranging of the machine, such as would be caused by its continued operation after the crank-arm $w^5$ has been raised, we provide the device Y, which is in the form of a bar pivotally mounted upon a pin $y^7$ upon the plate V, and depending therefrom into a position just in front of the shifting-lever $y^6$. The lower end of the device Y has an aperture $y^8$, as shown in Fig. 1 of the drawings, and the lower end of the aperture is in the form of a parallel slot $y^9$. The end of the shaft $y^5$ is made to project into the end of said slot and carries a washer $y^{10}$ on the front side thereof, so as to act as a guide for the bar Y and prevent it from swinging. The upper end of the aperture in the device Y is enlarged so as to give free play to a pin $y^{11}$ projecting from the front face of the lever $y^6$; and it will be noted that at the upper end of the slot $y^9$ the aperture $y^8$ has an oblique-face $y^{12}$ which is below and out of the way of the path of the pin $y^{11}$. Should, however, the machine be opened without shifting the lever $y^6$ to cut out the machine, then the bar Y is raised and the oblique-face $y^{12}$ strikes the pin $y^{11}$ and shifts it automatically into the cut-out position, this action being completed before the plate V has been fully raised. A weight $y^{13}$ may be placed on the shaft $y^5$ to assist the weight of the lever $y^6$ in holding the clutch in gear.

*The hand-operating mechanism.*—For the purpose of conveniently turning over the machine by hand, we provide at the left-hand end of the machine a hand-wheel Z mounted on an inclined shaft $z'$, which carries at its other end a beveled gear $z^2$, which meshes with a gear $z^3$ mounted upon the main shaft N. The end of the shaft $z'$ projects beyond the beveled gear $z^2$ and is supported in a socket in the bearing $b^6$, and said shaft is also supported in a bearing $z^4$ formed in the casting $f^{17}$. As will be seen from Fig. 3, the shaft is provided with a collar $z^5$ which turns in said bearing $z^4$, but is also capable of an endwise movement therein, so that when the hand-wheel Z and shaft $z'$ is pulled forward a distance equal to the length of the bearing $z^4$, the beveled gear $z^2$ will be withdrawn from mesh with the gear $z^3$, and the collar $z^5$ will drop down over the edge of the bearing $z^4$ and hold the shaft in this position, as shown in the dotted lines in Fig. 3, which will be the normal position occupied by the shaft when the machine is in operation. When it is desired to turn the shaft over by hand, the power being cut off, the wheel Z is raised a sufficient distance to allow the collar $z^5$ to slip into the bearing $z^4$ and the shaft to move longitudinally until the two beveled gears $z^2$, $z^3$ mesh with each other. A pin $z^6$ or like device is set in the shaft to the rear of the collar $z^5$ to limit the outward movement thereof.

While we have hereinabove shown the most improved form of our invention, we wish it understood that not all of the features are essential thereto or necessarily made in the exact form shown, but various changes and modifications in the construction as herein shown may be made without departing from the spirit of our invention, and we wish it understood therefore that the latter is not otherwise limited than by the reasonable scope of our claims. In the claims the word "sausage" is used to designate cased meats in general.

Having thus described our invention, what we claim as new and desire to secure by Letters Patent is:

1. A machine of the class described comprising, in combination, means for holding and advancing a sausage, means adapted to carry a cord around said sausage, and means for forming stitches between the convolutions of the cord.

2. A machine of the class described comprising, in combination, means for holding and advancing a sausage, means for carrying two cords partly around the sausage, and means for interengaging the two cords with each other at the meeting points.

3. A machine of the class described comprising, in combination, means for holding and advancing a sausage, a pair of devices one adapted to carry a cord part way around the sausage and the other adapted to carry a second cord around the remainder of the circumference of the sausage, and means for interengaging said cords at the junction points of their respective arcs.

4. In a machine of the class described, the combination of means for holding and advancing a sausage, a device for carrying a cord around the sausage, and a looping-device adapted to form stitches upon said cord between the successive convolutions thereof.

5. In a machine of the class described, the combination of a pair of cord-carrying devices, means for moving them through opposite semicircular arcs to form together a complete encircling movement, and means for interengaging said cords at the junction-points of their respective arcs.

6. In a machine of the class described, the combination of a pair of cord-carrying devices, means for moving them through opposite semicircular arcs to form together a complete encircling movement, and means for engaging the cords at the terminal points of their respective arcs in the form of loops having a length equal to the distance between successive convolutions.

7. In a machine of the class described, the combination of a pair of cord-carrying devices, means for moving them through opposite semicircular arcs to form together a complete encircling movement, and a pair of stitch-forming devices opposite the terminal points of the respective arcs adapted to engage the respective cords and to carry a loop in one cord through a bight in the other cord, thereby forming a loop-stitch.

8. In a machine of the class described, the combination of a pair of cord-carrying arms, means for carrying said arms in a reciprocating semicircular path, the two paths being complementary to each other, and a pair of looping-devices located at the terminal points of said arcuate paths, each adapted to hold the cord of one of said arms passed around the same, engage the cord of the other arm as it reaches a point opposite the looping-device, form a loop on said last-named cord, and carry it through the loop of said first-named cord.

9. In a machine of the class described, a cord-carrying device comprising, in combination, a cord-carrying arm, a pair of pivoted crank-arms on the ends of which said cord-carrying arm is pivotally mounted, and means for simultaneously rotating said crank-arms through parallel and equal arcs whereby said cord-carrying arm is carried parallel to itself through an arcuate path.

10. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, and means for simultaneously reciprocating the two racks.

11. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between the two racks, and means for reciprocating said racks.

12. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between the two racks, a rock-lever operatively connected with said racks to reciprocate them, and means for reciprocating said rock-lever.

13. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between the two racks, a rock-lever operatively connected with said racks to reciprocate them, and a cam adapted to reciprocate said rock-lever.

14. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between said racks having a channel-shaped trough therein, a rock-lever carrying a bearing-block engaging in said trough, and means for operating said rock-lever.

15. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between said racks having a channel-shaped trough therein, a rock-lever carrying a bearing-block engaging in said trough, a rock-shaft on which said rock-lever is mounted, a cam-arm mounted on said shaft, and a rotary cam engaging said cam-arm.

16. In a machine of the class described, a cord-carrying device comprising, in combination, a cord-carrying arm, a pair of pivoted crank-arms on the ends of which said cord-carrying arm is pivotally mounted, gear-teeth on the hubs of the respective crank-arms, a pair of racks engaging the respective sets of gear-teeth, a rigid connection between said racks having a channel-shaped trough therein, a rock-lever carrying a bearing-block engaging in said trough, a rock-shaft on which said rock-lever is mounted, a cam-arm mounted on said shaft, a spherical cam-roller mounted on the end of said cam-arm, and a rotary cam having a cam-groove in the plane face thereof in which groove the roller-bearing end of said cam-arm engages.

17. The combination of two cord-carrying arms, two pairs of crank-arms of equal radius on the extremities of which the two cord-carrying arms are respectively pivotally mounted, and means for simultaneously rotating all of said crank-arms in the same direction through equal arcs.

18. The combination of two cord-carrying arms, two pairs of crank-arms of equal radius on the extremities of which the two cord-carrying arms are respectively pivotally mounted, and means for simultaneously rotating all of said crank-arms in the same direction through equal arcs not less than a semicircle, whereby the paths of said cord-carrying arms meet at their ends and are complementary to each other.

19. The combination of two cord-carrying arms, two pairs of crank-arms of equal radius on the extremities of which the two cord-carrying arms are respectively pivotally mounted, a plurality of reciprocating-bars each connected with one of said crank-arms in a manner to rotate it, all of said crank-arms being rotated in the same direction by a corresponding longitudinal movement of said reciprocating bars in the same direction, and means for simultaneously reciprocating all of said bars concomitantly in the same direction.

20. The combination of two cord-carrying arms, two pairs of crank-arms of equal radius on the extremities of which the two cord-carrying arms are respectively pivotally mounted, a plurality of reciprocating-bars each connected with one of said crank-arms in a manner to rotate it, all of said crank-arms being rotated in the same direction by a corresponding longitudinal movement of said reciprocating bars in the same direction, means for simultaneously reciprocating all of said bars concomitantly in the same direction, rigid connections connecting said bars in pairs corresponding to the respective cord-carrying arms, a bar transverse to said reciprocating bars and having an operative connection therewith, and means for reciprocating said transverse bar whereby said reciprocating bars are reciprocated in the direction of their length.

21. The combination of two cord-carrying arms, two pairs of crank-arms of equal radius on the extremities of which the two cord-carrying arms are respectively pivotally mounted, a plurality of reciprocating-bars each connected with one of said crank-arms in a manner to rotate it, all of said crank-arms being rotated in the same direction by a corresponding longitudinal movement of said reciprocating bars in the same direction, means for simultaneously reciprocating all of said bars concomitantly in the same direction, rigid connections connecting said bars in pairs corresponding to the respective cord-carrying arms, a bar transverse to said reciprocating bars and having an operative connection therewith, a rock-shaft having rock-arms on the ends of which said transverse bar is mounted, and means for operating said rock-shaft.

22. The combination of two cord-carrying arms, two pairs of crank-arms of equal radius on the extremities of which the two cord-carrying arms are respectively pivotally mounted, a plurality of reciprocating-bars each connected with one of said crank-arms in a manner to rotate it, all of said crank-arms being rotated in the same direction by a corresponding longitudinal movement of said reciprocating bars in the same direction, means for simultaneously reciprocating all of said bars concomitantly in the same direction, rigid connections connecting said bars in pairs corresponding to the respective cord-carrying arms, a bar transverse to said reciprocating bars and having an operative connection therewith, a rock-shaft having rock-arms on the ends of which said transverse bar is mounted, a cam-arm mounted on said rock-shaft, and a cam engaging said rock-arm.

23. The combination of two cord-carrying arms, two pairs of crank-arms of equal radius on the extremities of which the two cord-carrying arms are respectively pivotally mounted, a plurality of reciprocating-bars each connected with one of said crank-arms in a manner to rotate it, all of said crank-arms being rotated in the same direction by a corresponding longitudinal movement of said reciprocating bars in the same direction, means for simultaneously reciprocating all of said bars concomitantly in the same direction, rigid connections connecting said bars in pairs corresponding to the respective cord-carrying arms, a bar transverse to said reciprocating bars and having an operative connection therewith, said means permitting of a sliding-movement of one pair of reciprocating-bars lengthwise of said transverse bar, and means for reciprocating said transverse bar in a direction transverse to its axis.

24. In a machine of the class described, the combination of a support, a gear-wheel pivoted thereupon, said support having a parallel-sided groove in its face a part of which is behind the periphery of said gear, a rack-bar mounted in said recess and engaged by the periphery of said gear to hold it in place, and a plurality of rack-teeth carried on said bar and meshing with said gear.

25. In a machine of the class described, the combination of a support, a gear-wheel pivoted thereupon, said support having a parallel-sided groove in its face a part of which is behind the periphery of said gear, a rack-bar mounted in said recess and engaged by the periphery of said gear to hold it in place, and a rack secured to the face of said rack-bar and having teeth engaging with the teeth of said gear.

26. In a machine of the class described, the combination of a support, a gear-wheel pivoted thereupon, said support having a parallel-sided groove in its face a part of which is behind the periphery of said gear, a rack-bar mounted in said recess and engaged by the periphery of said gear to hold it in place, a rack mounted on the face of said rack-bar and meshing with the teeth of said gear, and countersunk screws passing through holes in said rack-bar from the back thereof and securing said rack to said rack-bar.

27. In a machine of the class described, the combination of a shaft, an arm carried thereby, a curved needle mounted on the end of said arm, a needle-guide having an apertured lug through which said needle passes, and a cord-carrying member adapted to move to a point adjacent to said needle; said needle-guide having guiding-surfaces for said cord-carrying member whereby it is held in definite relation to said needle.

28. In a machine of the class described, the combination of a shaft, an arm carried thereby, a curved needle mounted on the end of said arm, a needle-guide having an apertured lug through which said needle passes, and a cord-carrying member adapted to move to a point adjacent to said needle; said needle being movable axially and rotatively and said needle-guide being axially movable with said needle but not partaking of the rotative movement thereof.

29. In a machine of the class described, the combination of a member having a bearing, a sleeve axially slidable within said bearing but not rotatable therein, a shaft rotatably mounted within said sleeve and axially movable with it, a needle-arm mounted on the end of said shaft, a curved needle carried by said needle-arm, and a needle-guide mounted on the end of said sleeve and having an apertured lug through which said needle passes.

30. In a machine of the class described, the combination of a frame carrying cord-carrying devices, means for shifting said frame toward and from a given point, a needle carried by said frame and movable independently thereof in the same direction as said frame, means for reciprocating said needle, and a connection between said needle and said frame whereby the needle receives from said frame a movement parallel thereto and equal in amount to one half its own movement.

31. In a machine of the class described, the combination with a frame of cord-carrying mechanism mounted on said frame and adapted to wrap a cord around a sausage, means for shifting said frame toward and from said sausage, a stitch-forming mechanism mounted on said frame and movable in the same direction therewith but independently thereof, and a connection between said frame and said stitch-forming mechanism whereby the latter is given one half the extent of movement of the former.

32. In a machine of the class described, the combination of means for holding a sausage, cord-wrapping devices on each side of the sausage, and means for shifting said cord-wrapping devices toward and from each other whereby different sizes of sausage are provided for.

33. In a machine of the class described, the combination of means for holding a sausage, cord-wrapping devices on each side of the sausage, means for shifting said cord-wrapping devices toward and from each other whereby different sizes of sausage are provided for, and stitch-forming devices on opposite sides of the sausage midway between said cord-wrapping devices and lying constantly in the median plane of the sausage.

34. In a machine of the class described, means for holding a sausage, two sets of cord-wrapping devices lying on opposite sides of the sausage, one being stationary and the other movable toward and from the first, stitch-forming devices lying in the median plane of the sausage midway between the two sets of cord-wrapping devices, and means for giving said stitch-forming devices a movement parallel and equal to one half of the amount of the movement of said cord-wrapping devices.

35. The combination of means for holding a sausage, a cord-wrapping device mounted on one side of said sausage in a fixed position, a second cord-wrapping device mounted on the other side of said sausage and movable toward and from it, a pair of stitch-forming devices carried by said movable cord-wrapping device and disposed on opposite sides of the sausage in the median plane thereof, and connections between said stitch-forming devices and the cord-wrapping device on which they are mounted giving to said stitch-forming devices a movement in the same direction as one-half the amount of the movement of said cord-wrapping device, whereby said stitch-forming devices are maintained constantly in the median plane of the sausage.

36. In a machine of the class described, means for holding and advancing a sausage comprising a plurality of devices forming together substantially a continuous tube which incloses the sausage, said tube being made up of elements which as the tube advances are continuously removed at the forward end and continuously added at the rear end.

37. In a device of the class described, a sausage-holder and carrier comprising a pair of claspers disposed on opposite sides of the sausage, means for moving said claspers toward each other to clasp the sausage, means for thereafter moving them parallel to one another to advance the sausage, and means for thereafter moving them edgewise apart from each other to release the sausage.

38. In a device of the class described, a sausage-holder and carrier comprising a pair of claspers disposed on opposite sides of the sausage, means for moving said claspers toward each other to clasp the sausage, means for thereafter moving them parallel to one another to advance the sausage, means for thereafter moving them edgewise apart from each other to release the sausage and means for thereafter returning them to the point of beginning so that they are carried through continuous similar cycles.

39. In a device of the class described, the combination of a pair of tracks or runways substantially parallel to the movement of the sausage, sausage-holding devices movable upon said tracks or runways, and means for moving said sausage-holding devices in one direction along one runway, thereafter transferring it to the opposite runway, then moving it in the opposite direction along the second runway, then transferring it to the first runway again, and so on through continuous cycles.

40. In a device of the class described, a sausage-holder and carrier comprising, in combination, a pair of tracks or runways substantially parallel to the movement of the sausage, and a plurality of sausage-holding devices distributed along said tracks or runways; in conjunction with means for advancing said devices along said runways in opposite direction at the same rate and transferring each device as it reaches the end of the runway on which it is located to the opposite runway.

41. In a device of the class described, a sausage-holder and carrier comprising, in combination, a pair of tracks or runways substantially parallel to the movement of the sausage, and a plurality of sausage-holding devices distributed equably along said tracks or runways; in conjunction with means for advancing all of said sausage-holding devices along said tracks or runways in opposite directions by a step-by-step movement, each step being equal to the distance between two adjacent devices, and at each step also transferring the end-device upon each track or runway to the opposite track or runway.

42. In a device of the class described, a sausage-holder and carrier comprising, in combination, a pair of parallel tracks or runways of equal length, their ends lying opposite each other, and a plurality of sausage-holding devices slidably mounted side by side upon the respective tracks or runways and completely filling them with the exception of two open spaces one at one end of one runway and one at the opposite end of the other runway; means for shifting the end-sausage-holding devices on each runway into the vacant space in the opposite runway, and means for thereafter shifting the entire row on each runway longitudinally the width of one sausage-holding device whereby the vacant spaces are formed again where they were at first.

43. In a device of the class described, the combination of a pair of oppositely disposed sausage-holders and carriers, each having oppositely disposed clasping-devices for the sausage; means for advancing the clasping-devices of the two opposite carriers toward each other in a direction transverse to the line of feed to clasp the sausage; means for thereafter advancing said claspers longitudinally while holding the sausage so as to advance the sausage; means for thereafter separating said claspers in a direction transverse to the line of feed so as to release the sausage, and means for thereafter returning them to the place of beginning.

44. In a machine of the class described, the combination of a pair of oppositely disposed sausage-holders and carriers each having a row of clasping-devices, the two rows being oppositely disposed and together forming a continuous tube wherein the sausage is held and by means of which it is advanced, means for advancing both rows concomitantly, and means for removing the clasping-devices as they reach the ends of the carriers and returning them to the opposite ends of the carriers and restoring them to clasping position.

45. In a machine of the class described, a sausage-holding and carrying device comprising, in combination, two sets of parallel runways, a plurality of claspers mounted in two rows on the respective sets of runways, said claspers carrying means for releasably engaging said runways, and a clasper-shifting device having a reciprocating movement in a path transverse to said runways and adapted at one extremity of its movement to release said means from the set of runways with which it is engaged and thence to carry it to the opposite set of runways.

46. In a machine of the class described, a sausage-holding and carrying device comprising, in combination, two sets of parallel runways, a plurality of claspers mounted in two rows on the respective sets of runways, said claspers carrying means for releasably engaging said runways, a clasper-shifting device having a reciprocating movement in a path transverse to said runways and adapted at one extremity of its movement to release said means from the set of runways with which it is engaged and thence to carry it to the opposite set of runways, and a longitudinally moving member adapted to engage the clasper as it reaches said last-named set of runways and move it longitudinally until it is disengaged from said shifting-device.

47. In a device of the class described, a sausage-carrier comprising two parallel sets of runways, a plurality of claspers mounted in two rows on the respective sets of runways, said claspers being provided with means which releasably engage said runways, and a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first.

48. In a device of the class described, a sausage-carrier comprising two parallel sets of runways, a plurality of claspers mounted in two rows on the respective sets of runways, said claspers being provided with means which releasably engage said runways, a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first, and means connecting the two shifting-devices whereby they have simultaneous and opposite movements.

49. In a device of the class described, a sausage-carrier comprising two parallel sets of runways, a plurality of claspers mounted in two rows on the respective sets of runways, said claspers being provided with means which releasably engage said runways, a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first, means connecting the two shifting-devices whereby they have simultaneous and opposite movements, and a pair of longitudinally moving members adapted to engage said end-claspers respectively as soon as they are shifted and move them longitudinally a distance equal to the width of one clasper.

50. In a device of the class described, a sausage-carrier comprising two parallel sets of runways, a plurality of claspers mounted in two rows on the respective sets of runways, said claspers being provided with means which releasably engage said runways, a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first, means connecting the two shifting-devices whereby they have simultaneous and opposite movements, a pair of longitudinally moving members adapted to engage said end-claspers respectively as soon as they are shifted and move them longitudinally a distance equal to the width of one clasper, and means for giving said longitudinally moving members a simultaneous movement in opposite directions.

51. In a device of the class described, a sausage-carrier comprising two parallel sets of runways, a plurality of claspers mounted in two rows on the respective sets of runways, said claspers being provided with means which releasably engage said runways; a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first, and a pair of longitudinally moving members one adapted to engage one of said end-claspers after being transferred and to advance it and the row of which it forms a part along the first set of runways, and the other adapted to engage the other end-clasper after being transferred and to advance it and the row of which it forms a part along the second set of runways.

52. In a device of the class described, a sausage-carrier comprising two parallel sets of runways, a plurality of claspers mounted in two rows on the respective sets of runways, said claspers being provided with means which releasably engage said runways; a pair of clasper-shifting devices having reciprocative movements at opposite ends of the runways and in paths transverse thereto, one clasper-shifting device being adapted to disengage the end-clasper of one row from the runways on which it is traveling and transfer it to the opposite runway and the other clasper-shifting device being adapted to release the end-clasper of the other row from the second set of runways and transfer it to the first, a pair of longitudinally moving members one adapted to engage one of said end-claspers after being transferred and to advance it and the row of which it forms a part along the first set of runways, and the other adapted to engage the other end-clasper after being transferred and to advance it and the row of which it forms a part along the second set of runways, and mechanism actuating said clasper-shifters and longitudinally moving devices in a cycle whereby the end-claspers are transferred and the rows of claspers advanced in alternate succession.

53. In a device of the class described, a sausage-carrier comprising a box open on one side, two sides of said box which lie opposite to each other having each a pair of parallel grooves forming runways, a plurality of claspers mounted in two rows each engaging one pair of grooves, the claspers being in number sufficient in each row to fill the space between the ends of said box with the exception of an empty space sufficient to admit one clasper, said claspers having each a pair of spring-devices which releasably engage the grooves on the opposite sides of the box, two pairs of carrier-rods extending longitudinally along the sides of the box and each having a dog mounted on its end adapted to engage the end-clasper of the row, a pair of reciprocating plungers at opposite ends of said box each having means for disengaging said spring-devices from the grooves and supporting the disengaged clasper and transferring it to the opposite pair of grooves, lever-mechanism mounted on said box and connected with said plungers to give them a simultaneous movement in opposite directions, lever-mechanism connecting the two pairs of carrier-rods and giving them a simultaneous opposite movement, and mechanism giving an alternate successive movement to the two lever-mechanisms whereby the claspers are alternately shifted and advanced, simultaneously in opposite directions in the two rows.

54. In a device of the class described, the combination of a grooved runway, a clasper comprising a bar and spring-lever mounted thereon and having a toe fitting and sliding in the groove of said runway, the spring of said lever acting to normally maintain said toe in engagement with said runway, and means for turning said lever so as to release the toe thereof from said runway.

55. In a device of the class described, the combination of a grooved runway, a clasper comprising a bar and spring-lever mounted thereon and having a toe fitting and sliding in the groove of said runway, the spring of said lever acting to normally maintain said toe in engagement with said runway, and a device adapted to turn said lever so as to disengage the toe thereof from said runway and thereafter move the clasper in a direction transverse to said runway.

56. In a device of the class described, the combination of a grooved runway, a clasper comprising a bar and spring-lever mounted thereon and having a toe fitting and sliding in the groove of said runway, the spring of said lever acting to normally maintain said toe in engagement with said runway, a second runway parallel to the first, and a shifting-device adapted to act on said lever to release the toe thereof from one of said runways at the same time supporting the clasper and to thereafter carry it to the opposite runway.

57. In a device of the class described, the combination of a grooved runway, a clasper comprising a bar and spring-lever mounted thereon and having a toe fitting and sliding in the groove of said runway, the spring of said lever acting to normally maintain said toe in engagement with said runway, said lever having on the end opposite said toe a nose, a second runway parallel to the first, and a shifting-device having a reciprocative movement in a direction transverse to said runways and having a notch adapted to engage said nose and thereby support said clasper and simultaneously disengage the toe of said lever from the runway, the reciprocative movement of said shifting-device acting thereafter to transfer said clasper to the other runway.

58. In a device of the class described, a clasper for a sausage having a spring-bow and a flexible connection between the ends of said bow adapted to partially embrace and hold the sausage.

59. In a device of the class described, a clasper comprising a body-member, a spring-bow having a stem adjustably mounted on said body-member, and flexible material connecting the ends of said bow and adapted to partially embrace and hold a sausage when the latter is pressed against it.

60. In a device of the class described, a clasper comprising a body-member having a transverse bore, a stem slidably mounted within said bore, a spring-bow mounted on said stem and a flexible connection uniting the ends of said spring-bow.

61. In a device of the class described, a clasper comprising a body-member having a transverse bore, a stem slidably mounted within said bore, a spring-bow mounted on said stem, a flexible connection uniting the ends of said spring-bow, a screw-plug threaded into said bore, and a spring abutting at one end on said plug and at the other on said stem giving an adjustable resiliency to said spring-bow.

62. In a device of the class described, a clasper comprising a transverse bar having a pair of spring-levers mounted on the ends thereof, said spring-levers having on one end of each an outwardly projecting toe adapted to engage in a guiding-groove or runway.

63. In a device of the class described, a clasper comprising a transverse bar having a pair of spring-levers mounted on the ends thereof, said spring-levers having on one end of each an outwardly projecting toe adapted to engage in a guiding-groove or runway and the other end of each lever having an inwardly projecting nose.

64. In a device of the class described, a clasper comprising a transverse bar having a pair of spring-levers mounted on the ends thereof, said spring-levers having on one end of each an outwardly projecting toe adapted to engage in a guiding-groove or runway and the other end of each lever having an inwardly projecting nose on which is mounted a small roller.

65. In a machine of the class described, the combination of a pair of carriers for a sausage one of which carriers is stationary and the other of which has a reciprocating movement toward and from the first.

66. In a machine of the class described, the combination of a pair of carriers for a sausage one of which carriers is stationary and the other of which has two reciprocating movements toward and from the first, to wit, one for removing it to a distance from the first whereby the machine is opened and the other for adjusting its position when the machine is closed.

67. In a machine of the class described, the combination of a pair of carriers for a sausage one of which carriers is stationary and the other of which has a reciprocating movement toward and from the first, a third member to which said movable carrier is connected; means for moving said third member toward and from said fixed carrier whereby the machine is opened; and means for adjusting the distance between said movable carrier and said third member whereby the machine is adjusted to different-sized sausages.

68. In a machine of the class described, the combination with a frame of a carrier slidably mounted on said frame, a toggle-joint connected at one end to said frame and at the other end to said carrier, and means for flexing said toggle-joint whereby said carrier is moved along said frame.

69. In a machine of the class described, the combination with a frame of a carrier slidable up and down on said frame, a toggle-joint connected at one end to said frame and at the other end to said carrier, means for flexing said toggle-joint whereby said carrier is raised upon said frame, and a counterweight overbalancing the weight of said carrier and by means of which the carrier is raised when said toggle-joint is flexed.

70. In a machine of the class described, the combination with a frame of a rising and falling carrier slidably mounted thereon, a counterweight overbalancing the weight of said carrier by means of which it is caused to rise when released, a toggle-joint connected at one end to said frame and at the other to said carrier and when extended holding said carrier depressed, and a lever-arm connected with said toggle-joint for flexing and straightening it.

71. In a machine of the class described, the combination with a frame, a rising and falling carrier slidably mounted thereon, a shaft mounted in bearings upon said carrier and rising and falling therewith, a lever-arm mounted upon said shaft, and a toggle-joint one end of which is fixed upon said shaft and the other pivotally mounted on said frame.

72. In a machine of the class described, the combination with a frame, a rising and falling carrier slidably mounted thereon, a shaft mounted in bearings upon said carrier and rising and falling therewith, a lever-arm mounted upon said shaft, a toggle-joint one end of which is fixed upon said shaft and the other pivotally mounted on said frame, and a counterweight overbalancing the weight of said carrier and the parts rising and falling therewith.

73. In a machine of the class described, the combination of a movable sausage carrier, a relatively fixed member, a screw-stem connecting said fixed member with said carrier and turning in bearings in the former and in a threaded socket in the latter, and a crank adapted to rotate said screw-stem to adjust the distance between said carrier and said fixed member.

74. In a machine of the class described, the combination of a movable sausage carrier, a relatively fixed member, a screw-stem turning in bearings in said fixed member and engaging a threaded socket on said carrier whereby the rotation of said screw-stem is accompanied by an adjustive movement of said carrier toward and from said relatively fixed member, a shaft mounted on said fixed member, and gearing connecting said shaft and screw-stem.

75. In a machine of the class described, the combination of a movable sausage carrier, a relatively fixed member, a screw-stem turning in bearings in said fixed member and engaging a threaded socket on said carrier whereby the rotation of said screw-stem is accompanied by an adjustive movement of said carrier toward and from said relatively fixed member, a shaft mounted on said fixed member, gearing connecting said shaft and screw-stem, and a resilient holding device adapted to prevent accidental turning of said shaft.

76. In a machine of the class described, the combination of a movable sausage carrier, a relatively fixed member, a screw-stem turning in bearings in said fixed member and engaging a threaded socket on said carrier whereby the rotation of said screw-stem is accompanied by an adjustive movement of said carrier toward and from said relatively fixed member, a shaft mounted on said fixed member, gearing connecting said shaft and screw-stem, a star-wheel mounted on said shaft, and a roller resiliently pressed against said star-wheel whereby accidental movement of said shaft is prevented.

77. In a machine of the class described, in combination with a sausage-holder and carrier, a relatively fixed member, a pair of screw-stems journaled upon said fixed member and engaging threaded sockets carried by said carrier, a shaft mounted on said fixed member transversely to said screw-stems, gearing connecting each screw-stem with the shaft, and an operating handle on one end of said shaft.

78. In a machine of the class described, in combination with a sausage-holder and carrier, a relatively fixed member, a pair of screw-stems journaled upon said fixed member and engaging threaded sockets carried by said carrier, a shaft mounted on said fixed member transversely to said screw-stems, gearing connecting each screw-stem with the shaft, an operating handle on one end of said shaft, a star-wheel mounted on said shaft, and a resiliently pressed roller engaging said star-wheel.

79. In a machine of the class described, in combination with a frame, a rising and falling carrier mounted thereon, a relatively fixed member, a connection between said fixed member and carrier whereby the height of the latter is adjusted, an operating-handle for adjusting said carrier, and a counterweight supporting said carrier.

80. In a machine of the class described, the combination of a rising and falling carrier, a rising and falling member mounted above said carrier, a connection between said carrier and said member for adjusting the relative height of said carrier with respect to said member, an operating-handle on said member whereby the height of said carrier is adjusted, a connection between said frame and said member for raising and lowering the latter through a fixed travel, and hand-operated mechanism for operating said connection as described.

81. In a machine of the class described, the combination with a frame, a rising and falling carrier, a rising and falling member mounted above said carrier, a connection between said carrier and said member for adjusting the relative height of said carrier with respect to said member, an operating-handle on said member whereby the height of said carrier is adjusted, a shaft mounted on said member, a hand-lever for turning said shaft, and a device connecting said member with said frame and operating to raise said member when said shaft is turned in one direction and lower said member when it is turned in the other direction.

82. In a machine of the class described, the combination with a frame, a rising and falling carrier, a rising and falling member mounted above said carrier, a connection between said carrier and said member for adjusting the relative height of said carrier with respect to said member, an operating-handle on said member whereby the height of said carrier is adjusted, a shaft mounted on said member, a hand-lever for turning said shaft, and a toggle-joint connecting said member and frame, the lower end of said toggle-joint being mounted on said shaft.

83. In a machine of the class described, the combination with a frame, a rising and falling carrier mounted thereon, a rising and falling member slidably mounted on said frame, a screw-stem journaled in said member and engaging a threaded socket on said carrier, means for manually turning said screw-stem, a toggle-joint connecting said member with said frame, and means for manually flexing and straightening said toggle-joint.

84. In a machine of the class described, the combination with a frame, of a rising and falling carrier mounted thereon, a rising and falling member slidably mounted on said frame, a screw-stem journaled in said member and engaging a threaded socket on said carrier, means for manually turning said screw-stem, a toggle-joint connecting said member with said frame, means for manually flexing and straightening said toggle-joint, and a counterweight overbalancing said carrier and member and the parts supported thereby and adapted to raise them.

85. In a machine of the class described, the combination with a frame having a plurality of vertical posts, a carrier slidably mounted upon said posts, a member slidably mounted upon said posts above said carrier, a pair of vertical screw-stems journaled in bearings in said member and engaging threaded sockets on said carrier, a horizontal shaft mounted on said member, gearing operatively connecting said shaft with said screw-stems, a hand-crank adapted to rotate said shaft, a second horizontal shaft mounted on said member, a pair of toggle-joints the lower ends of which are mounted on said shaft and the upper ends pivoted upon said frame, whereby said toggle-joints are extended in the lowered position of said member and flexed in the raised position thereof, and a hand-lever mounted on said last-named shaft for flexing and straightening said toggle-joints.

86. In a machine of the class described, the combination with a frame having a plurality of vertical posts, a carrier slidably mounted upon said posts, a member slidably mounted upon said posts above said carrier, a pair of vertical screw-stems journaled in bearings in said member and engaging threaded sockets on said carrier, a horizontal shaft mounted on said member, gearing operatively connecting said shaft with said screw-stems, a hand-crank adapted to rotate said shaft, a second horizontal shaft mounted on said member, a pair of toggle-joints the lower ends of which are mounted on said shaft and the upper ends pivoted upon said frame, whereby said toggle-joints are extended in the lowered position of said member and flexed in the raised position thereof, a hand-lever mounted on said last named shaft for flexing and straightening said toggle-joints, a sheave mounted on said frame over said member, a flexible connection secured to said carrier and passing over said sheave, and a counterweight connected to the opposite end of said flexible connection and having sufficient weight to overbalance the weight of said carrier and member and the parts supported thereby, whereby upon the flexing of said toggle-joints said carrier is automatically raised.

87. In a machine of the class described, the combination of two coöperating symmetrically disposed units, each unit comprising sausage-holding and carrying devices, mechanism for operating said sausage-holding and carrying-devices whereby a sausage held between them is automatically advanced, a fixed shaft carrying driving-mechanism, means for varying the distance between said two units, and driving connections between said first-named mechanism and said driving-mechanism permitting of said relative movements between the two units without disengaging said connection.

88. In a machine of the class described, the combination of two coöperating symmetrically disposed units, each unit comprising sausage-holding and carrying devices and tying mechanism, mechanism for operating said sausage-holding and carrying devices whereby a sausage held between them is automatically advanced, a fixed shaft carrying driving-mechanism, means for varying the distance between said two units, and driving connections between said first-named mechanism and said driving-mechanism permitting of said relative movements between the two units without disengaging said connection.

89. In a machine of the class described, the combination of two coöperating symmetrically disposed units, each unit comprising sausage-holding and carrying devices, means for varying the distance between said two units, mechanism adapted to operate said sausage-holding and carrying-devices, a set of cams, means for driving said cams, and means operatively connecting said cams to said mechanism permitting the distance between said units to be varied without disengaging the said operative connection.

90. In a machine of the class described, the combination of two coöperating symmetrically disposed units, each unit comprising sausage-holding and carrying-devices, means for varying the distance between said units, mechanism for driving said holding- and carrying-devices, a shaft, a set of cams mounted on said shaft, means for driving said shaft, and means operatively connecting said cams with said mechanism and permitting the distance between said units to be varied without interfering with the operative connection.

91. In a machine of the class described, the combination of a pair of coöperating symmetrically disposed units each comprising sausage-holding and carrying-devices, means for varying the distance between said units, a slide-block having a movement parallel to the direction of movement of the sausage, a lever adapted to operate said holding- and carrying-devices and operating in a plane parallel to the plane of relative movement of said units, said slide-block having a slot transverse to the direction of its movement and said lever having a pin engaging in said slot, and means for operating said slide-block, whereby the distance between said units may be varied without affecting the operative connection between said slide-block and said holding- and carrying-devices.

92. In a machine of the class described, the combination of a pair of coöperating symmetrically disposed units each comprising sausage-holding and carrying-devices, means for varying the distance between said units, a slide-block having a movement parallel to the direction of movement of the sausage, a lever adapted to operate said holding- and carrying-devices and operating in a plane parallel to the plane of relative movement of said units, said slide-block having a slot transverse to the direction of its movement and said lever having a pin engaging in said slot, a rotating-cam, and a connection between said slide-block and said cam for reciprocating said block.

93. In a machine of the class described, the combination of a pair of coöperating symmetrically disposed units, one of said units being movable toward and from the other, each of said units comprising sausage-holding and carrying-devices, a pair of levers mounted on each unit for actuating said holding- and carrying-devices, a pair of slide-blocks having reciprocating movements parallel to the direction of advancement of the sausage, each slide-block having a slot transverse to its direction of movement, one of said levers on each unit having a pin engaging in the slot of one block and the other lever of each unit having a pin engaging in the slot of the other block, a rotating-shaft, a pair of cams mounted on said shaft, and means engaging said slide-blocks with the respective cams whereby they are given independent reciprocating movements, thereby independently actuating said levers without interfering with the movement of one of said units toward and from the other as aforesaid.

94. In a machine of the class described, the combination of a rising and falling unit, said unit comprising an infeed and a delivery-carrier and cord-carrying mechanism between them, each carrier comprising a set of claspers arranged in two rows one above the other, clasper-shifting devices at the ends of the rows adapted to transfer the end-claspers from one row to the opposite row, and two pairs of carrier-rods extending longitudinally along the sides of both carriers, the lower pair having means for advancing the lower rows of carriers and the upper pair having means for advancing the upper rows of carriers; a rock-shaft journaled on the end of one of said carriers and having double rock-arms mounted thereon, each rock-arm connected with an upper and a lower carrier-rod, a slide-block moving in a direction parallel to the movement of the sausage and having a transverse slot, a crank mounted on said rock-shaft and having a pin engaging in said slot; bell-crank levers mounted on the frames of said carriers and connected with said clasper-shifting devices, a parallel bar uniting said bell-crank levers and adapted by a longitudinal movement to oscillate them simultaneously, stitch-forming mechanism carried between said carriers, a rock-shaft operating said stitch-forming mechanism, a rock-arm mounted on and operating said last-named rock-shaft and connected with said parallel bar, a third rock-shaft, a rock-arm mounted on said shaft and connected with said parallel bar to reciprocate it, a second slide-block having a reciprocating movement in a direction parallel to the movement of the sausage and having also a transverse slot, a crank mounted on said last-named rock-shaft and having a pin engaging in the slot of said last-named slide-block whereby said shaft is oscillated by the reciprocation of said slide-block, and means for giving independent reciprocative movements to the respective slide-blocks whereby said carrier-rods, clasper-shifting devices, and stitch-forming mechanism are actuated at the proper times independently of the vertical adjustment of said unit.

95. In a machine of the class described, the combination of a moving cord-carrying arm, means for guiding a cord on said arm, a tension-device mounted on said arm, a quantity of cord supported in fixed position, and a tension-device through which the cord drawn therefrom passes on its way to said cord-carrying arm.

96. In a machine of the class described, the combination of a laterally moving cord-carrying arm, a cord-cop mounted in fixed position, means for guiding the cord from said cop to said cord-carrying arm, a fixed tension-device through which the cord passes on its way to said cord-carrying arm and adapted to create in said cord only sufficient tension to prevent its becoming slack, and a second tension-device mounted on said cord-carrying arm and adapted to place said cord under the tension under which it is wrapped.

97. In a machine of the class described, the combination of a pair of laterally moving cord-carrying arms one above the other on opposite sides of the object to be wrapped, a cord-cop mounted in fixed position above the upper cord-carrying arm, means for guiding the cord from said cop downwardly to said upper cord-carrying arm, a tension-device through which said cord passes on its way to said upper cord-carrying arm and adapted to place only sufficient tension upon said cord to prevent its becoming slack, a second tension-device mounted on said cord-carrying arm and adapted to create in said cord the tension under which it is wrapped, a second cop mounted below the lower cord-carrying arm, means for guiding the cord from said second cop to said lower cord-carrying arm, a tension-device through which said last-named cord passes on its way to said cord-carrying arm and adapted to place only sufficient tension thereon to prevent the cord from becoming slack, and another tension-device mounted on said lower cord-carrying arm and adapted to place said cord under the tension with which it is wrapped.

98. In a machine of the class described, the combination with the main shaft of a driving-element for said shaft and a clutch connecting the two elements; means for shifting said clutch into active and inactive positions, sausage-holding and carrying-devices, means for separating said devices, and a device actuated by said separating means for shifting said clutch into inactive position.

99. In a machine of the class described, the combination of a main shaft, a driving-element for said shaft, a clutch connecting said element with said shaft, and a shifting-device adapted to shift said clutch into operative and inoperative positions; a rising and falling element adapted to open the machine for inspection when it rises, and a device mounted on said rising and falling element and adapted in rising to actuate said shifting-device to move it into inoperative position.

100. In a machine of the class described, the combination of a main shaft, a driving-element therefor, a clutch adapted to connect said main shaft with said driving-element, and a shifting-lever adapted to shift said clutch into active and inactive positions; in conjunction with sausage-holding and carrying-devices, means for raising one set of said devices to open the machine for inspection, and an element connecting said rising and falling set of devices with said shifting-lever so as to move it to shift said clutch into inoperative position when said set of devices is raised.

101. In a machine of the class described, in combination with a main shaft and driving-element for said shaft, a clutch adapted to connect said main shaft with said driving-element, a shifting-lever adapted to shift said clutch into operative and inoperative positions, and a laterally projecting element on said lever at a distance from the fulcrum thereof; in conjunction with two sets of sausage-holding and carrying-devices, one of which can be raised relative to the other to open the machine for inspection, and a bar mounted upon an element carried by said raisable set of devices; said bar having an oblique cam-edge adapted to strike said laterally projecting element and move it so as to turn said lever into the position corresponding to the inactive position of said clutch when said bar rises.

102. In a machine of the class described, the combination of a shaft, an arm carried thereby, a curved hooked needle mounted on the end of said arm, a needle-guide having an apertured lug through which said needle passes, and a cord-carrying member adapted to move to a point adjacent to said needle.

In witness whereof we have hereunto set our hands this eighth day of June, 1909.

GEORG HOEFER.
GEORGE ANTON STROHHAECKER.

Witnesses:
WM. F. MAURER,
JAS. L. WARNES.